United States Patent
Zorin et al.

(10) Patent No.: US 10,870,412 B2
(45) Date of Patent: Dec. 22, 2020

(54) SYSTEM AND METHOD FOR CONTROLLING ACCESS TO A CYBER-PHYSICAL SYSTEM

(71) Applicant: AO Kaspersky Lab, Moscow (RU)

(72) Inventors: Sergey G. Zorin, Moscow (RU); Alexander V. Shadrin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 16/441,893

(22) Filed: Jun. 14, 2019

(65) Prior Publication Data

US 2020/0254970 A1 Aug. 13, 2020

(30) Foreign Application Priority Data

Feb. 7, 2019 (RU) .................................. 2019103370

(51) Int. Cl.
*B60R 25/24* (2013.01)
*B60R 25/04* (2013.01)
(Continued)

(52) U.S. Cl.
CPC .............. *B60R 25/24* (2013.01); *B60R 25/04* (2013.01); *G06F 21/55* (2013.01); *G06F 21/577* (2013.01)

(58) Field of Classification Search
CPC ....... B60R 25/24; B60R 25/04; G06F 21/577; G06F 21/55
(Continued)

(56) References Cited

U.S. PATENT DOCUMENTS 5,400,246 A * 3/1995 Wilson .................... G06F 3/023
340/12.53
5,491,631 A * 2/1996 Shirane ................... F02D 41/22
123/479
(Continued)

FOREIGN PATENT DOCUMENTS

EP 0980165 2/2000
EP 2690826 1/2014
(Continued)

OTHER PUBLICATIONS

What is Industrial? Hewlett Packard Enterprise. https://www.hpe.com/ru/ru/what-is/industrial-iot.html As accessed on Jun. 14, 2019.
(Continued)

*Primary Examiner* — Daryl C Pope
(74) *Attorney, Agent, or Firm* — Patterson Thuente Pedersen, P.A.

(57) ABSTRACT

Systems and methods for controlling access to a cyber-physical system (CPS). A security tool can perform access authorization by analyzing messages sent through the CPS, creating a plurality of fictitious messages, sending the plurality of fictitious messages though the CPS, and checking whether correct authorization data is included in the analyzed messages to determine authorized or unauthorized access to the CPS. An access monitoring tool can detect a change in a functional CPS module related to unauthorized access to the CPS, and responsive to the detection of a change in a functional CPS module related to unauthorized access to the CPS, change a state of a functional CPS module using a monitoring rule.

20 Claims, 14 Drawing Sheets

(51) Int. Cl.
*G06F 21/55* (2013.01)
*G06F 21/57* (2013.01)

(58) Field of Classification Search
USPC .............. 340/340, 426.11, 425.5, 3.1, 506
See application file for complete search history.

(56) References Cited

U.S. PATENT DOCUMENTS

| | | | |
|---|---|---|---|
| 7,269,675 | B2 | 9/2007 | Dalakuras et al. |
| 9,116,786 | B2 | 8/2015 | Ricci |
| 9,401,923 | B2 | 7/2016 | Valasek et al. |
| 9,560,071 | B2 | 1/2017 | Ruvio et al. |
| 9,616,828 | B2 | 4/2017 | Ben-Noon et al. |
| 9,697,355 | B1 | 7/2017 | Park et al. |
| 10,124,750 | B2 | 11/2018 | Markham |
| 10,140,450 | B1 | 11/2018 | Litichever et al. |
| 2003/0191667 | A1* | 10/2003 | Fitzgerald ............... G16H 70/20 705/2 |
| 2007/0240213 | A1 | 10/2007 | Karam et al. |
| 2013/0104231 | A1 | 4/2013 | Niner et al. |
| 2013/0212659 | A1 | 8/2013 | Maher et al. |
| 2015/0020152 | A1 | 1/2015 | Litichever et al. |
| 2015/0113638 | A1 | 4/2015 | Valasek et al. |
| 2016/0173397 | A1 | 6/2016 | Yajima et al. |
| 2016/0205194 | A1 | 7/2016 | Kishikawa et al. |
| 2017/0093866 | A1 | 3/2017 | Ben-Noon et al. |
| 2017/0109521 | A1 | 4/2017 | Ujiie et al. |
| 2018/0205703 | A1 | 7/2018 | Grau |
| 2018/0337932 | A1 | 11/2018 | Juster et al. |
| 2019/0036946 | A1 | 1/2019 | Ruvio et al. |

FOREIGN PATENT DOCUMENTS

| | | |
|---|---|---|
| EP | 3128699 | 2/2017 |
| RU | 2440902 | 1/2012 |
| RU | 2613927 | 3/2017 |
| WO | WO9627513 | 9/1996 |
| WO | WO2013144962 | 10/2013 |

OTHER PUBLICATIONS

Federal insurance effective Law of Apr. 25, 2002 No. 40-FZ (rev. of Jul. 26, 2017) "On mandatory of civil liability of vehicle owners" (with amendments and additions, from Sep. 25, 2017).

Bosch automotive electrics and automotive electronics: systems and components, networking and hybrid drive. Springer Vieweg, 2014. $5^{th}$ edition.

GOST standard R 50905-96 Vehicles, Electronic Equipment. General Technical Requirements. (1996) Available at http://gostexpert.ru/data/files/50905-96/2b69bd5c274253406177c1465b029f98.pdf.

GOST R ISO 11898-1-2015 Vehicles, On-Road. Controller Area Network (CAN). Part 1. Channel Level and Transfer of Signals. (2016).

GOST R 41.97-99. Standard instructions regarding official approval of vehicle alarm systems (VAS) and of mechanical vehicles as to their alarm systems (AS). (1999).

Valasek et al., "Adventures in Automotive Networks and Control Units", Technical White Paper. IOActive Comprehensive Information Security. ©2014. https://ioactive.com/pdfs/IOActive_Adventures_in_Automotive_Networks_and_Control_Units.pdf.

Miller et al., "Remote Exploitation of an Unaltered Passenger Vehicle" Aug. 10, 2015.

European Extended Search Report for Ep Application No. 19187685.3 dated Nov. 28, 2019.

Guo et al., "An Automotive Security System for Anti-Theft" Mar. 1, 2009. 2009 Eighth International Conference on Networks.

Shanker, "Enhancing Automotive Embedded Systems with FPGAs", Nanyang Technological University. Apr. 2016.

* cited by examiner

| 2001 | Heart Rate Monitor | 2009 | Ultraviolet Radiation Sensor | 2022 | Accelerometer |
| --- | --- | --- | --- | --- | --- |
| 2002 | Blood Oxygen Saturation Sensor | 2010 | Geolocation Receiver | 2023 | Gyroscope |
| 2003 | Pedometer | 2011 | GSM Module | 2024 | Hall Sensor |
| 2004 | Fingerprint Sensor | 2012 | Bluetooth | 2025 | Dosimeter |
| 2005 | Gesture Sensor | 2013 | Wi-Fi | 2026 | NFC Module |
| 2006 | Camera Directed at Eyes | 2014 | Camera | 2027 | LTE Module |
| 2007 | User Body Temperature Sensor | 2015 | Ambient Temperature Sensor | | |
| 2008 | Microphone | 2016 | Barometer | | |
| | | 2017 | Electronic Compass | | |
| | | 2018 | Humidity Sensor | | |
| | | 2019 | Lighting Sensor | | |
| | | 2020 | Proximity Sensor | | |
| | | 2021 | Image Depth Sensor | | |

FIG. 1d

SYSTEM AND METHOD FOR CONTROLLING ACCESS TO A CYBER-PHYSICAL SYSTEM

RELATED APPLICATION

This Application claims the benefit of Russian Federation Patent Application No. RU2019103370, filed Feb. 7, 2019, which is fully incorporated by reference herein.

TECHNICAL FIELD

Embodiments relate generally to the field of computer security, and, more specifically, to security for cyber-physical systems.

BACKGROUND

Unauthorized access to cyber-physical systems (CPS) is a rapidly growing threat. Cyber-physical systems are systems in which computing resources are integrated into physical processes. Examples of CPSs include Industrial Control Systems (ICSs), Internet of Things, and Industrial Internet of Things systems, electronic systems of vehicles, and other electronic systems. A representative example of a threat to CPSs is the Stuxnet computer worm, initially found during a cyber attack on APCSs of Iranian industrial companies. Cyber attacks on Ukrainian nuclear power plants and even on cable car servers in Moscow are also known. At the same time, unauthorized access to cyber-physical systems is often connected not only with cyber attacks, but also with malicious actions of offenders. As a result of unauthorized access, a cyber-physical system can malfunction, which may cause downtime, financial losses, and even real threat to the environment and population.

Another representative example of threats caused by unauthorized access to CPSs is theft of vehicles. For this reason, vehicles have a number of safety features, from basic protection using a mechanical key against physical access to the inside of the car and the possibility to start the engine to complex anti-theft devices, such as an immobilizer. Immobilizers are vehicle access monitoring systems usually based on the principle of interruption of electrical circuits of the car (see, for example, Russian Patent No. 2440902) that supply power, for example, to ignition coils, fuel pumps, fuel injectors, and the starter motor, etc. Such devices are hidden in the car and connected to the relevant circuit. Also, anti-theft devices can have a wireless communication unit for exchanging data with a transmitter/transponder controlled by the user of the vehicle. In case of unauthorized access to the vehicle or an attempt to start the engine, the immobilizer locks the engine or other functional modules of the vehicle. Immobilizers connected to a vehicle's data buses (for example, to a multiplex data bus) and perform user authorization (see, for example, Russian Patent No. 2613927) are also known. In case of unsuccessful user authorization, the immobilizer sends an engine locking command through the data bus. However, the above-described anti-theft devices have a number of drawbacks. They are expensive to install and can be found and subsequently disabled by an offender. In addition, an offender knowing the immobilizer operation logic can connect to the data bus (for example, via the ODB-II port or by removing the headlight connected to the data bus and connecting to the data bus at that point) and block the immobilizer's commands to shut the car down.

The vehicle example illustrates the technical problem with known CPS access monitoring systems, which enable offenders to bypass such systems and gain unauthorized access to a CPS.

SUMMARY

Embodiments described herein substantially meet the aforementioned needs of the industry. For example, a first technical result includes improving the characteristics of cyber-physical system access monitoring tools, such as the locking degree, reliability, and fail-safety. A second technical result includes preventing an offender from obtaining data required for authorization of access to a cyber-physical system.

In an embodiment, a system for controlling access to a cyber-physical system (CPS), comprises at least one electronic control unit (ECU) including at least one processor and memory operably coupled to the at least one processor; instructions that, when executed on the at least one ECU, cause the at least one ECU to implement: a security tool configured to perform access authorization by: analyzing a plurality of messages sent through the CPS, creating a plurality of fictitious messages, the plurality of fictitious messages addressed to at least one of the ECUs to which the plurality of messages are addressed, sending the plurality of fictitious messages though the CPS in random order and with random delay, and checking whether correct authorization data is included in the analyzed messages to determine authorized or unauthorized access to the CPS; an access monitoring tool configured to detect a change in at least one functional CPS module related to unauthorized access to the CPS, and responsive to the detection of a change in at least one functional CPS module related to unauthorized access to the CPS, change a state of at least one functional CPS module using at least one monitoring rule.

In an embodiment, a method for controlling access to a cyber-physical system (CPS), the system including at least one electronic control unit (ECU) including at least one processor and memory operably coupled to the at least one processor comprises performing access authorization by: analyzing a plurality of messages sent through the CPS, creating a plurality of fictitious messages, the plurality of fictitious messages addressed to at least one of the ECUs to which the plurality of messages are addressed, sending the plurality of fictitious messages though the CPS in random order and with random delay, and checking whether correct authorization data is included in the analyzed messages to determine authorized or unauthorized access to the CPS; detecting a change in at least one functional CPS module related to unauthorized access to the CPS; and responsive to the detection of a change in at least one functional CPS module related to unauthorized access to the CPS, changing a state of at least one functional CPS module using at least one monitoring rule.

In an embodiment, a vehicle comprises a drivetrain gateway configured to deliver power to vehicle wheels; a multimedia gateway configured to control multimedia for the vehicle; a transmission gateway configured to control the vehicle wheels through the drivetrain gateway, wherein each of the drivetrain gateway, the multimedia gateway, and the transmission gateway includes at least one electronic control unit (ECU), at least one security tool configured to perform access authorization by: analyzing a plurality of messages sent through the vehicle, creating a plurality of fictitious messages, sending the plurality of fictitious messages though the vehicle, and checking whether correct authorization data is included in the analyzed messages to determine authorized or unauthorized access to the vehicle; and at least one access monitoring tool configured to: detect a change in at least one functional CPS module related to unauthorized access to the CPS, and responsive to the detection of a change in at least one functional CPS module related to unauthorized access to the CPS, change a state of at least one functional CPS module using at least one monitoring rule.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1b is a block diagram of an example of a particular implementation of the technological system of FIG. 1a.

FIG. 1d is a block diagram of a possible set of device sensors, according to an embodiment.

Figure 1A:
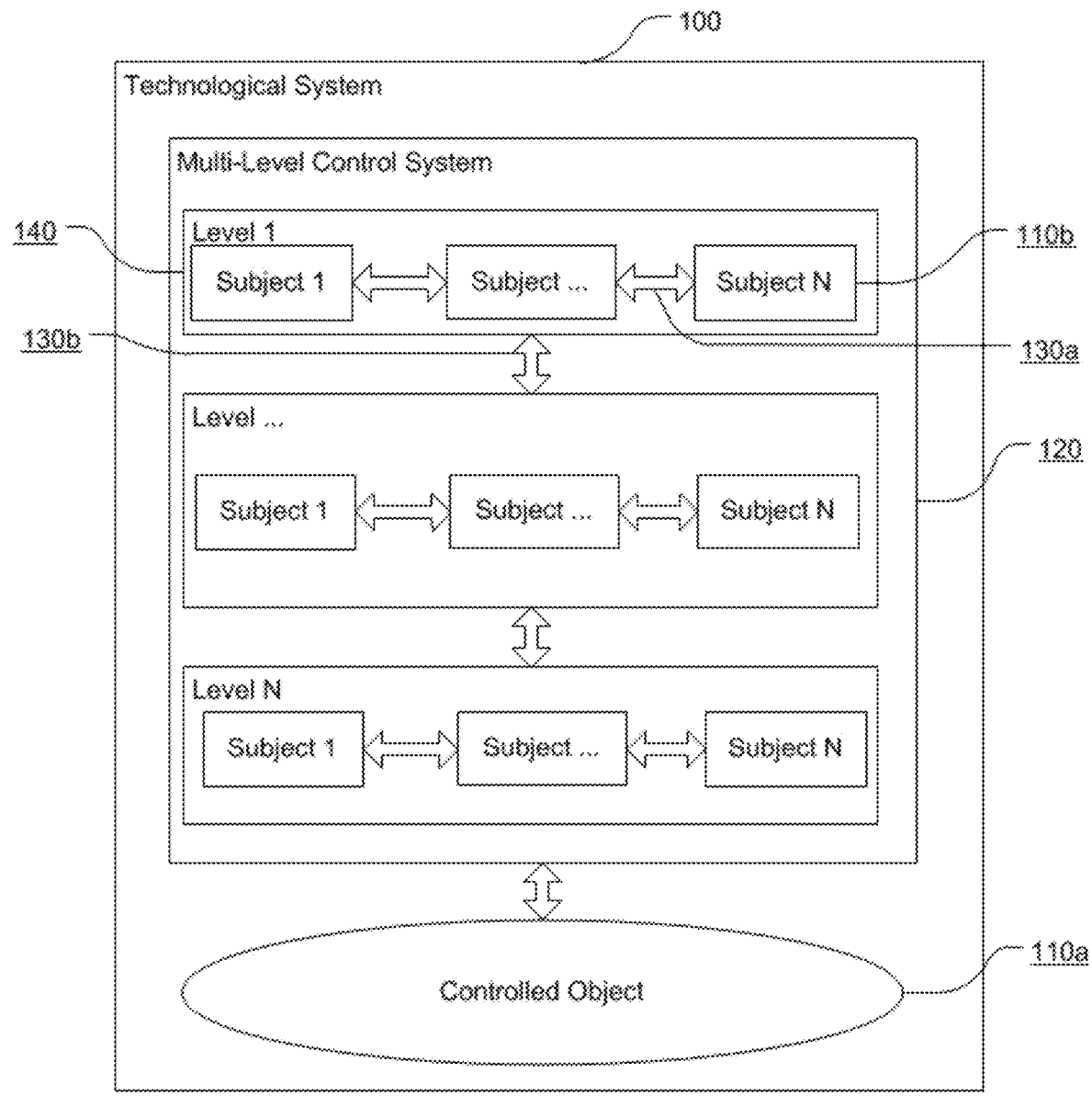
FIG. 1a is a block diagram of an example of a technological system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The following definitions and concepts are used throughout the description in particular embodiments.

For example, a controlled object is a process object to which external influences (control and/or disturbances) are directed, in order to change its state. In an embodiment, such objects can be a device (for example, an electric motor) or a process (or part thereof).

In an embodiment, a technological process (TP) can be a process of material production consisting in consecutive change of the states of a material substance (work object).

In an embodiment, process control can be a set of methods used for controlling technological parameters when making the final product.

In an embodiment, a control loop can consist of material substances and control functions for automated control of the values of measured technological parameters towards the values of the desired setpoints. A control loop includes sensors, controllers and actuators.

In an embodiment, a process variable (PV) can be a current measured value of a certain part of a TP being monitored or controlled. A process variable can be, for example, a sensor measurement.

In an embodiment, a setpoint can be a process variable value being maintained.

In an embodiment, a manipulated variable (MV) can be a variable being regulated in order to maintain a process variable value at a setpoint level.

In an embodiment, external influence can be a method of changing the state of an element to which the influence is directed (for example, an element of a technological system (TS)), in a determined direction. For example, influence from a TS element to another TS element can be sent in the form of a signal.

In an embodiment, a state of the controlled object can be a combination of its substantial properties expressed by state variables, which are modified or maintained under external influences, including controlling influences from a control subsystem. A state variable can be one or multiple numerical values characterizing a substantial property of an object. In an embodiment, a state variable is a numerical value of a physical quantity.

In an embodiment, a formal state of the controlled object can be a state of the controlled object corresponding to the process schedule and other technical documents (in the case of a TP) or movement schedule (in the case of a device).

In an embodiment, a controlling influence can be a purposeful (the purpose of the influence is to influence the object's state), legitimate (prescribed by the TP) external influence of controlling subjects of a control subsystem on a controlled object, which changes or maintains the state of the controlled object.

In an embodiment, a disturbance can be a purposeful or non-purposeful non-legitimate (not prescribed by the TP) external influence on the state of a controlled object, including by a controlling subject.

In an embodiment, a controlling subject can be a device which directs a controlling influence to a controlled object or transfers the controlling influence to another controlling subject for conversion before being directly sent to the object.

In an embodiment, a multilevel control subsystem can be a system including multiple levels, a combination of controlling subjects.

In an embodiment, a cyber-physical system can be an information technology concept involving integration of computing resources into physical processes. In such a system, sensors, equipment and information systems are connected all along the value creation chain which extends beyond the limits of a single enterprise or business. These systems interact with each other using standard Internet protocols for forecasting, self-adjustment, and adaptation to changes. Examples of a cyber-physical system include a technological system, the Internet of Things (including portable devices), or the Industrial Internet of Things.

In an embodiment, the Internet of Things (IoT) is a computer network of physical objects ("things") equipped with built-in technologies for interaction with each other or with the outside environment. The Internet of Things includes such technologies as portable devices, electronic systems of vehicles, smart cars, smart cities, or industrial systems, etc.

In an embodiment, the Industrial Internet of Things (IIoT) is a sub-category of the Internet of Things, which also includes consumer-oriented applications, for example, portable devices, "smart home" technologies and automatically driven cars. A distinguishing feature of both IoT and IIoT devices with built-in sensors, machines, and infrastructure, which send data through the Internet and are software-controlled.

In an embodiment, a technological system (TS) can be a functionally inter-related combination of controlling subjects of a multilevel control subsystem and a controlled object (TP or device), which, through a change in the states of controlling subjects, performs a change of the controlled object's state. The structure of a technological system is formed by the main elements of the technological system (inter-related controlling subjects of a multilevel control subsystem and a controlled object) and the relations between these elements. Where a technological process is the controlled object in a technological system, the final goal of the control is to change the state of the work object (raw material, a blank, etc.) through a change in the state of the controlled object. Where a device is the controlled object in a technological system, the final goal of the control is to change the state of the device (a vehicle, a spatial object). A functional inter-relation between the elements of a TS can be an inter-relation between the states of these elements. In this case, there may not be a direct physical connection between elements. In one example, there is no physical connection between actuators and a process operation, but, for example, a cutting speed can be functionally related to a spindle rotation rate, despite the fact that these state variables are not physically connected.

In an embodiment, a state of the controlling subject can be a combination of its substantial properties expressed by state variables, which are modified or maintained under external influences.

In an embodiment, substantial properties (and, accordingly, substantial state variables) of a controlling subject can be properties which directly influence substantial properties of the controlled object's state. In this case, the substantial properties of a controlled object are properties directly influencing the controlled factors (accuracy, safety, efficiency) of the operation of a TS. Particular examples include cutting modes matching formally preset modes, a train moving in accordance with a schedule, or reactor temperature maintained within acceptable limits. Depending on the controlled factors, variables of the controlled object's state are selected. Subsequently, variables of the states of the controlling subjects related to such variables and which exert controlling influence on the controlled object can be selected.

In an embodiment, a state of a technological system element can be a state of a controlling subject and/or a controlled object.

In an embodiment, a real state of a technological system element can be a state of a technological system element at some moment of influence on the controlled object, as determined by measuring state parameters and by intercepting signals (traffic) between the TS elements. State variables can be measured, for example, using sensors installed in a TS.

In an embodiment, a real state of a technological system can be a combination of inter-related real states of the technological system's elements.

In an embodiment, a cybernetic unit can be an element of a cyber-physical monitoring system that monitors the operation process of an element of the technological system.

In an embodiment, a state space can be a method for formalizing a change in the states of a dynamic system (a technological system or a cyber-physical system).

In an embodiment, a computer attack, or a cyber attack, can be a purposeful influence on information systems and information/telecommunication networks using software/technical means, exerted in order to breach information security in such systems and networks.

In an embodiment, a vehicle is a device configured for road transportation of people, cargo or equipment.

A cyber-physical system can further include electronic systems, such as: controlled objects, sensors and setpoint generators, and controlling subjects, such as electronic control units. For example, sensors and setpoint generators can determine the operating conditions (for example, engine RPM in a vehicle) and the setpoints (for example, the position of a switch). Sensors and setpoint generators convert physical variables into electrical signals. In another example, an Electronic Control Unit (ECU) is a structurally separated and functionally complete part of electronic equipment including an electronic circuit of any degree of complexity for processing of information presented by electrical signals of an established form. In an embodiment, an ECU processes information from sensors and setpoint generators in computing processes (open and closed loop control algorithms). In a vehicle, for example, an ECU controls actuators, sending electrical signals to the actuators, and, in addition, an ECU is an interface for other systems and for the vehicle diagnostics system. In another example, actuators convert electrical signals from ECUs into mechanical variables (for example, raising the needle of an electromagnetic valve).

In an embodiment, a bus can be a topology of a data transfer network in which all nodes are connected by passive communication lines allowing data transfer in both directions.

Figure 8:
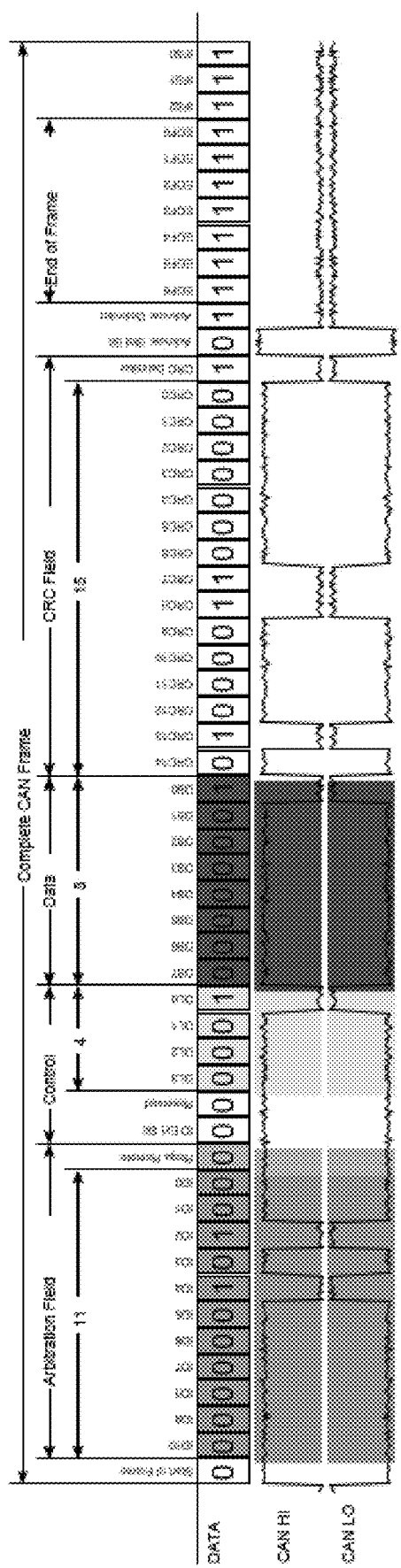
FIG. 8 is a block diagram of a data frame, according to an embodiment.

In an embodiment, a frame (or a message) is a data packet of a communication channel protocol. The frame can define the order and meaning of bits or bit fields in a sequence of transmission over a communication channel. For example, a block diagram of a data frame for a CAN bus frame is depicted in FIG. 8, according to an embodiment.

In an embodiment, an immobilizer is a device for preventing the use of a vehicle through the traction of its own engine. An immobilizer can be combined with other systems of the vehicle or built in those systems (for example, engine control system, alarm system). Therefore, an immobilizer prevents independent operation of a vehicle (immobilizes a vehicle) by at least one of: locking individual vehicle circuits needed for independent operation of the vehicle (for example, starter, ignition, fuel supply, engine, wheels, steering, etc.), or by code-based intervention into the operation of at least one control unit needed for the vehicle's operation, for example, the engine ECU, wheels ECU, steering ECU, etc.).

It should be noted that embodiments described herein can be applied to all types of cyber-physical systems, in particular, to automated process control systems (APCSs), Internet of Things, and Industrial Internet of Things, to all types of mechanical vehicles using engines (internal combustion engines, hydrogen engines, electric engines) and those including at least one ECU.

Referring to FIG. 1a, a block diagram of an example of a technological system 100 is depicted, according to an embodiment. Technological system 100 generally includes elements 110a and 110b, where the elements of a TS are: the controlled object 110a; the controlling subjects 110b, which form a multilevel control subsystem 120; horizontal links 130a and vertical links 130b. The controlling subjects 110b are grouped by levels 140.

Figure 1B:
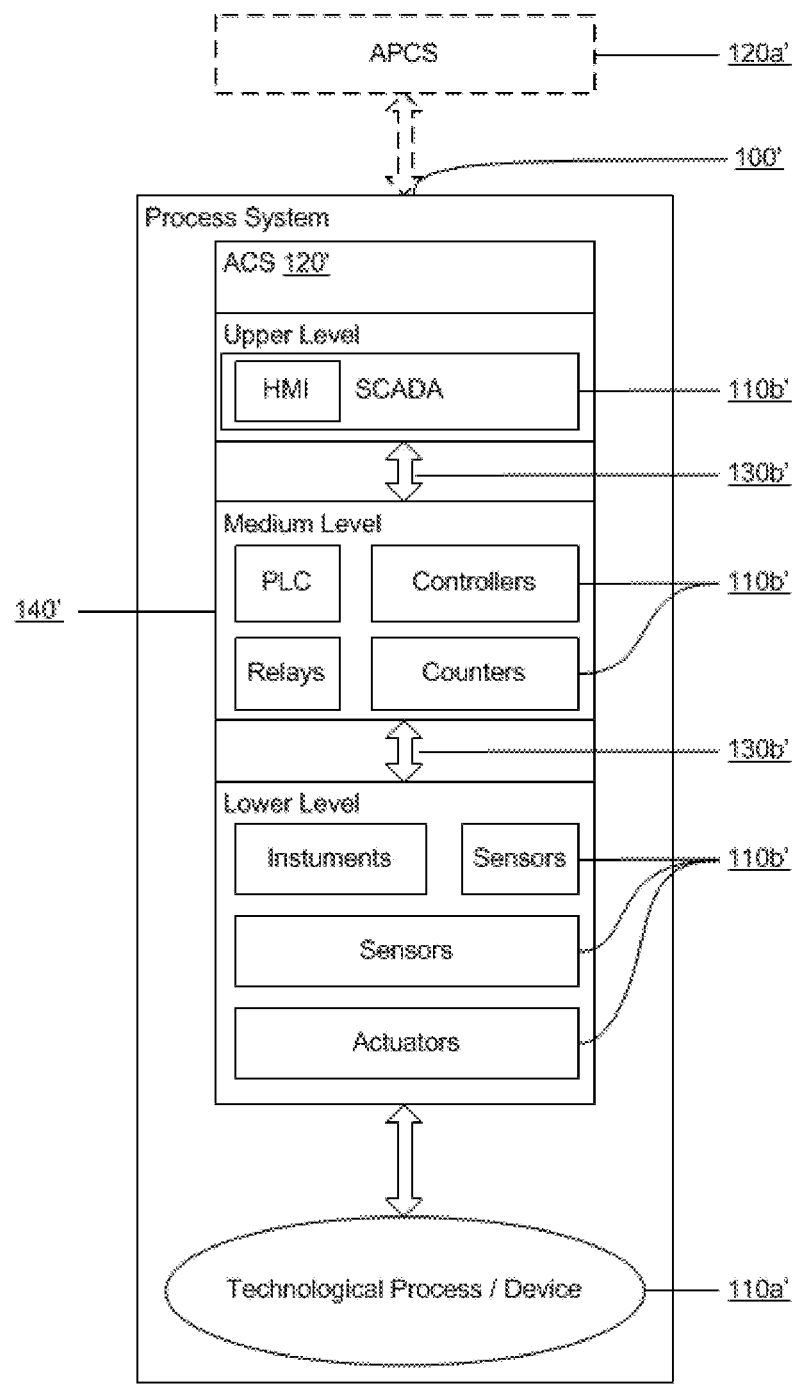

Referring to FIG. 1b, a block diagram of an example of a particular implementation of the technological system 100' of FIG. 1a is depicted. A controlled object 110a' is a TP or a device. Controlling influences are sent to the controlled object 110a'. Controlling influences can be generated and performed by an automated control system (ACS) 120'. In an ACS, and as illustrated, three levels 140' are distinguished. Three levels 140' are composed of controlling subjects 110b', which are inter-related both horizontally using horizontal links (links within the level, not shown in FIG. 1b) and vertically using vertical links 130b' (links between the levels). The inter-connections can be functional such that a change of the state of a controlling subject 110b' on one level causes a change of the states of controlling subjects 110b' linked thereto, on that level and on other levels. The information about a change in the controlling subject's state can be sent in the form of a signal using the horizontal and vertical links established between the controlling subjects, i.e. the information about a change in the state of the controlling subject in question is an external influence in relation to other controlling subjects 110b'. The levels 140' in an ACS 120' are distinguished based on the purpose of the controlling subjects 110b'. The number of levels can vary depending on complexity of the automated control system 120'. Simple systems can include one or multiple lower levels. For the physical connection of TS elements (110a, 110b) and TS subsystems 100, wired networks, wireless networks, or integrated circuits are used. For the logical connection between TS elements (110a, 110b) and TS subsystems 100, Ethernet, industrial Ethernet, and industrial networks are used. Industrial networks and protocols or various types and standards are used: Profibus, FIP, ControlNet, Interbus-S, DeviceNet, P-NET, WorldFIP, LongWork, Modbus, etc.

The upper level (the supervisory control and data acquisition (SCADA) level) is a dispatcher/operator control level. In an embodiment, the upper level includes at least the following controlling subjects 110b': controllers, controlling computers, human-machine interfaces (HMIs) (shown in FIG. 1b as parts of a single SCADA controlling subject). The upper level is configured for tracking the states of TS elements (110a', 110b'), receiving and accumulating information about the state of TS elements (110a', 110b'), and when correction is needed for TS elements.

The middle level (the CONTROL level) is a level of controllers; it includes at least the following controlling subjects: programmable logic controllers (PLCs), counters, relays, regulators. The controlling subjects 110b' of the PLC type receive information from controlling subjects of "measuring instrumentation" type and from controlling subjects 110b' of the "sensors" type about the state of the controlled object 110a'. "PLC" type controlling subjects generate (create) controlling influence in accordance with a programmed control algorithm on "actuator" type controlling subjects. The actuators directly exert controlling influence (applying to the controlled object) on the lowest (Input/Output) level. An actuator is an element of an executive device (equipment). Controllers, for example, PID (proportional integral derivative) controllers, are devices in a control loop with feedback.

The lowest (Input/Output) level is the level of such controlling subjects as: sensors, instruments, which monitor the state of the controlled object 110a', and actuators. Actuators directly influence the state of the controlled object 110a' in order to bring it into compliance with the formal state, i.e. a state matching a process task, a process schedule or other technical documents (in the case of a TP), or with a movement schedule (in the case of a device). On this level, signals from "sensor" type controlling subjects 110b' are coordinated with the inputs of the middle-level controlling subjects, and the "PLC" type controlling influences generated by the controlling subjects 110b' are coordinated with the "actuator" type controlling subjects 110b', which carry the instructions out. An actuator is an element of an executive device. An executive device makes a regulating unit move in accordance with signals coming from a controller or a controlling device. Executive devices are the final link of the automated control chain and can generally include: amplification devices (a contactor, a frequency modulator, an amplifier, etc.); actuators (an electrical, pneumatic, or hydraulic drive) with feedback elements (output shaft position sensors, end position alarm sensors, manual drive sensors, etc.); or regulating units (faucets, valves, shutters, dampers, etc.).

Depending on the application environment, executive devices can have different configurations or designs. Actuators and regulating units are usually considered to be the main components of executive devices. In an embodiment, an executive device as a whole is called an actuator.

In an embodiment, ABCS 120a' is an Automated Business Control System.

Figure 1C:
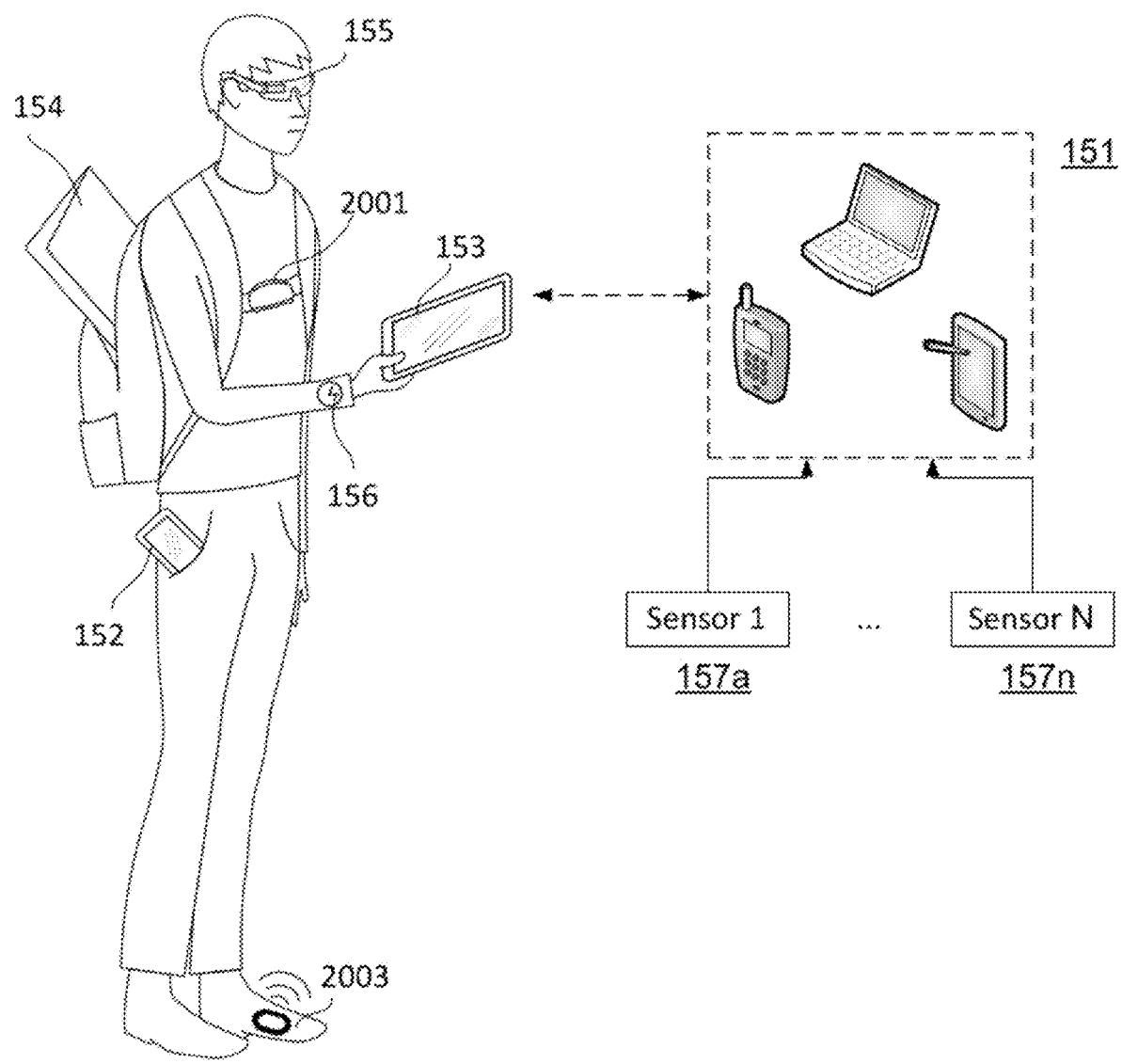
FIG. 1c is an illustration and block diagram of an example system utilizing the Internet of Things with portable devices, according to an embodiment.

Referring to FIG. 1c, an illustration and block diagram of an example system utilizing the Internet of Things with portable devices is depicted, according to an embodiment. In an embodiment, the system includes multiple various user computer devices 151. The user devices 151 can include, for example: a smartphone 152, a tablet 153, a notebook 154, portable devices, such as augmented reality goggles 155, a fitness tracker, and/or a smart watch 156, etc. The user devices 151 include multiple various sensors 157a-157n, for example, a heart rate monitor 2001 and a pedometer 2003.

It should be noted that the sensors 157a-157n can be located on either a single or multiple user devices 151. In addition, some sensors can be located on multiple devices at the same time. Some sensors can be provided in multiple copies. For example, a Bluetooth module can be located on all devices, while a smartphone can include two or more microphones to suppress noise and to determine the distance to the sound source.

Referring to FIG. 1d, a block diagram of a possible set of device sensors is depicted, according to an embodiment. More particularly, FIG. 1d depicts a possible set of sensors of the devices 151. The sensors 157a-157n can include, for example, the following:

a heart rate monitor (heartbeat sensor) 2001 for determining the user's pulse rate. In one embodiment, a heart rate monitor can include electrodes and take an electrocardiogram;

a blood oxygen saturation sensor 2002;

a pedometer 2003;

a fingerprint identification sensor 2004;

a gesture sensor 2005, used to identify user gestures;

a camera directed at the user's eyes 2006, for identification of the user's eye movements and for authentication of the user's identity by the eye's iris or retina;

a user body temperature sensor 2007 (for example, a sensor directly touching the user's body or a touchless one);

a microphone 2008;

an ultraviolet radiation sensor 2009;

a geolocation system receiver 2010, for example, a GPS, GLONASS, BeiDou, Galileo, DORIS, IRNSS, QZSS receiver, etc.;

a GSM module 2011;

a Bluetooth module 2012;

a Wi-Fi module 2013;

a camera 2014, directed at the environment surrounding the user device;

an ambient temperature sensor 2015;

a barometer 2016, for measuring atmospheric pressure and for determining the elevation above sea level in accordance with the atmospheric pressure;

a geomagnetic sensor 2017 (e.g. an electronic compass), for determining the cardinal directions and the azimuth;

an air humidity sensor 2018;

a lighting level sensor 2019, for determining color temperature and illumination;

a proximity sensor 2020, for determining the distance to various objects located in the proximity;

an image depth sensor 2021, for obtaining a three-dimensional image of space;

an accelerometer 2022, for measuring acceleration in space;

a gyroscope 2023, for determining position in space;

a Hall sensor 2024 (a magnetic field sensor), for determining magnetic field density;

a dosimeter/radiometer 2025, for determining radiation levels;

an NFC module 2026;

an LTE module 2027.

Figure 1E:
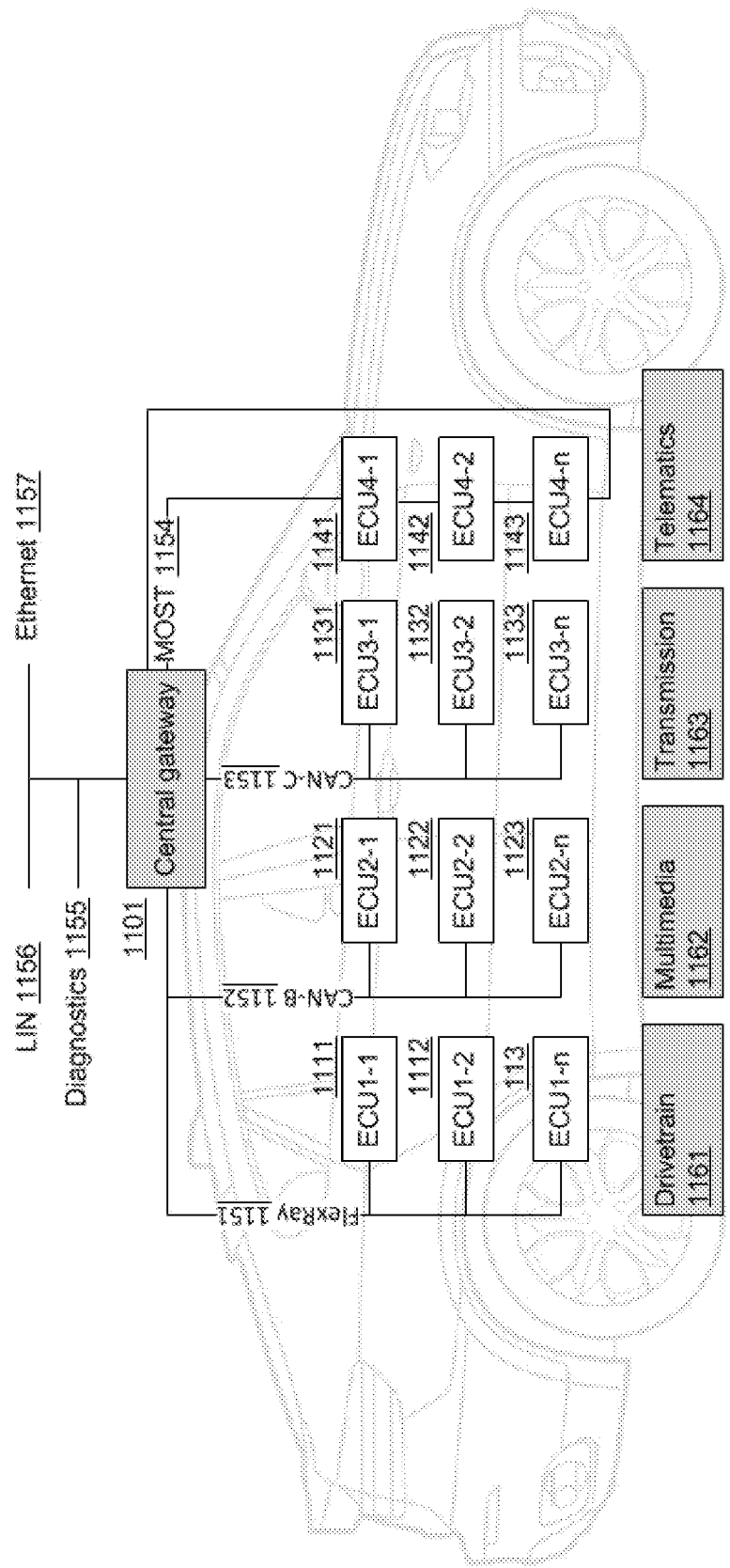
FIG. 1e is a block diagram of a vehicle network architecture, according to an embodiment.

Referring to FIG. 1e, a block diagram of a vehicle network architecture is depicted, according to an embodiment. As depicted, vehicles can be implemented with a number of particular buses (hereinafter also referred to as TS data buses). For example, a CAN (Controller Area Network) is a vehicle network standard (ISO 11898-1). A CAN bus is divided into a high-speed CAN-C (ISO 11898-2) bus, where the data transfer speed is from 125 Kbit/s to 1 Mbit/s, and a low-speed CAN-B (ISO 11898-3) bus, where the data transfer speed is from 5 to 125 Kbit/s. Also, in 2012, a CAN FD bus was introduced as an extension of an original CAN bus. FlexRay is the ISO 17458-1-17458-5 standard developed as a high-speed and reliable replacement for CAN. LIN (Local Interconnect Network) is the ISO 17987 standard for an industrial network intended for controlling low-responsibility automotive systems. MOST (Media Oriented Systems Transport) is de facto a standard for multimedia, information, and entertainment networks in the automotive industry. Ethernet is a technology for batch data transfer between devices for computer networks and industrial networks, described by IEEE standards of the 802.3 group.

It should be noted that the above-mentioned standards are constantly being improved, and that new standards and technologies used in vehicles are emerging as well. Therefore, the claimed invention is not limited by the standards mentioned herein but can be applied to any technologies that can be used in vehicles.

A TS network includes a central gateway 1101, ECUs 1111-1113 connected to the central gateway 1101 using a FlexRay 1151 bus, ECUs 1121-1123 connected to the central gateway 1101 using a CAN-B 1152 bus, ECUs 1131-1133 connected to the central gateway 1101 using a CAN-C 1153 bus, and ECUs 1141-1143 connected to the central gateway 1101 using a MOST 1154 bus. The central gateway 1101 is also an electronic control unit (ECU) and has outputs for the diagnostic bus 1155, LIN 1156 and Ethernet 1157. In this example, the TS network architecture includes a single central gateway 1101 connecting all TS subsystems using buses 1151-1157.

Figure 1F:
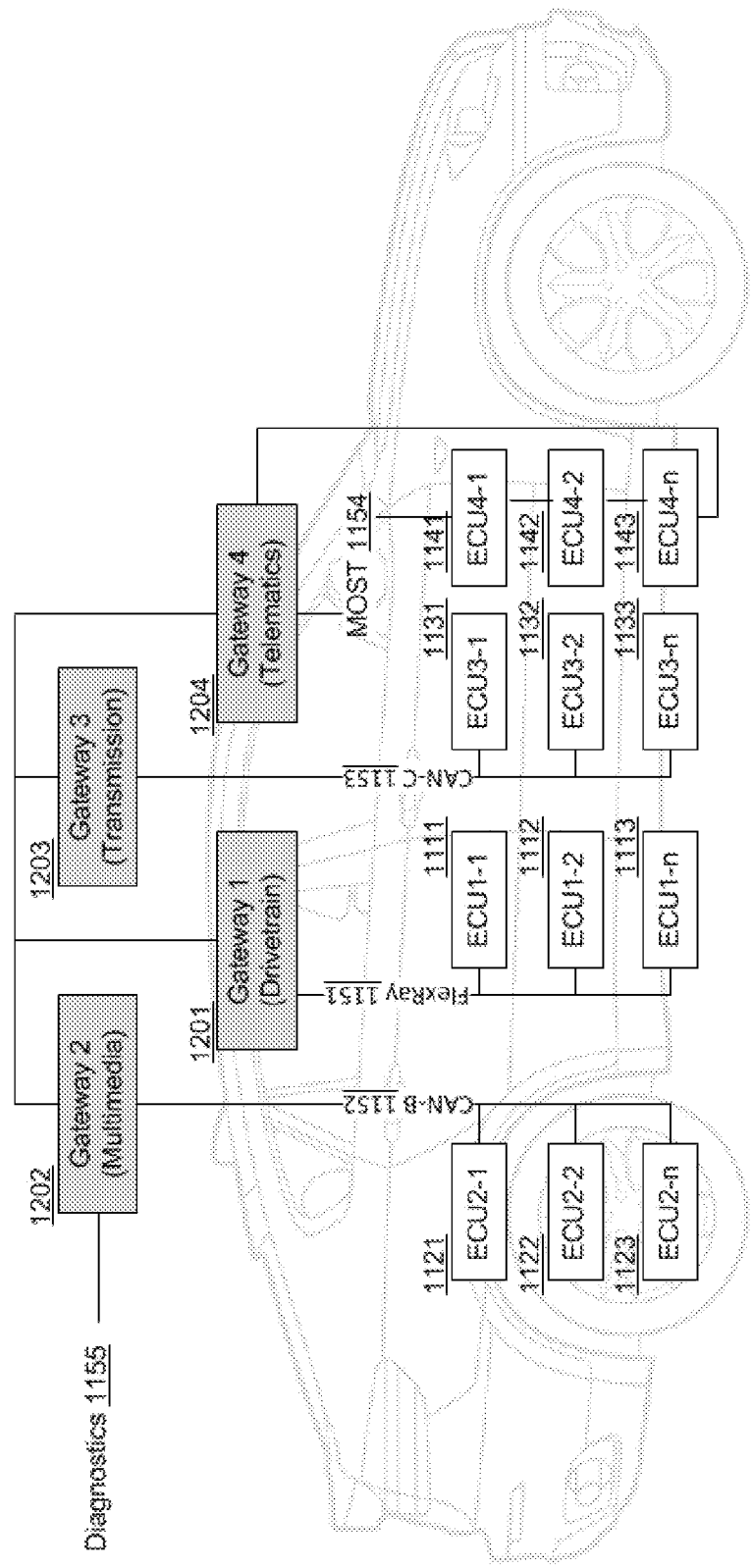
FIG. 1f is a block diagram of a vehicle network architecture, according to another embodiment.

Referring to FIG. 1f, a block diagram of a vehicle network architecture is depicted, according to another embodiment.

In particular, the vehicle network includes multiple interconnected gateways 1201-1204. Each of the interconnected gateways 1201-1204 is responsible for a specific sub-network (i.e. one TS data bus and the ECUs connected to a gateway). Thus, ECUs 1111-1113 (responsible for the vehicle's drivetrain) are connected to Gateway 1 (1201) using a FlexRay bus 1151. ECUs 1121-1123 (responsible for the vehicle's multimedia subsystems) are connected to Gateway 2 (1202) using a CAN-B bus 1152. ECUs 1131-1133 (responsible for the transmission) are connected to Gateway 3 (1203) using a CAN-C bus 1153. ECUs 1141-1143 (responsible for the telematics) are connected to Gateway 4 (1204) using a MOST bus 1154.

Figure 2:
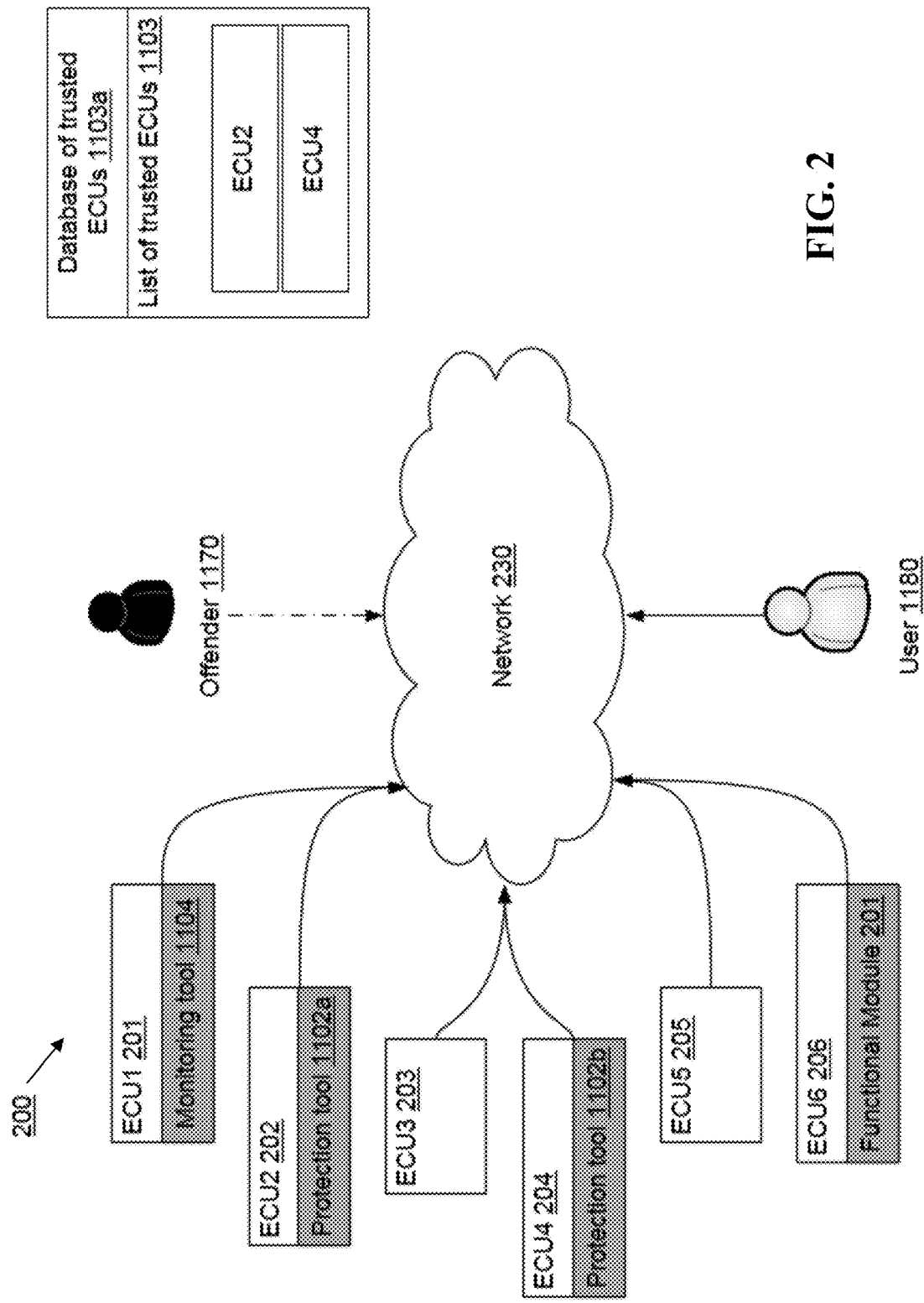
FIG. 2 is a block diagram of a CPS access monitoring system, according to an embodiment.

Referring to FIG. 2, a block diagram of a CPS access monitoring system is depicted, according to an embodiment.

In particular, FIG. 2 shows an example CPS access monitoring system including ECUs 201-206 interconnected by a network 230. The system 200 includes at least two protection tools (in the example being discussed, protection tools 1102a-1102b) installed on the electronic control units (ECUs) of the CPS from the trusted ECU list 1103. The trusted ECU list 1103 includes at least two ECUs and can be pre-built, for example, by the vehicle's manufacturer or dealer. The trusted ECU list 1103 is included in the trusted ECU database 1103a. In an embodiment, the protection tools 1102a-1102b and the monitoring tool 1104 are installed on one of the CPS ECUs 201-206 or are installed on or are themselves individual CPS ECUs.

The protection tools 1102a-1102b are configured for a mutual integrity check of the ECUs, authorization of access to the CPS if the integrity of the ECUs is not compromised, determining that access to the CPS is unauthorized, or whether the integrity of the ECUs is compromised, detection of a change in the state of at least one functional CPS module related to unauthorized access to the CPS, and sending a command to the monitoring tool 1104 to change the state of at least one functional module of the CPS. The monitoring tool 1104 is configured to change the state of at least one functional module of a CPS 201 using monitoring rules.

A cyber-physical system is shown in a simplified version in FIG. 2 for ease of explanation. One skilled in the art will appreciated that a cyber-physical system can include the above-described technological system 100 (FIGS. 1a-1b), the Internet of Things (FIGS. 1c-1d), the Industrial Internet of Things, or a vehicle (FIGS. 1e-1f). A vehicle is hereinafter discussed as the main example of a CPS 200.

Therefore, it should be noted that, in different embodiments, a CPS is, in particular, one of the following: a vehicle, an automated process control system (APCS), the Internet of Things, or the Industrial Internet of Things, while a functional module is represented by at least one CPS ECU, used to monitor access to the CPS. In another embodiment, the vehicle's functional module is an ECU of one of the following: the engine, a wheel, or the steering, and a change in the state of the functional module includes at least one of the following: a start of the vehicle's engine, or immobilization of the vehicle. Continuing the example, the monitoring rules can include at least one of: immobilization of the vehicle if a start of the engine is detected. Other embodiments are presented below, such as in the description of FIG. 6.

Figure 3:
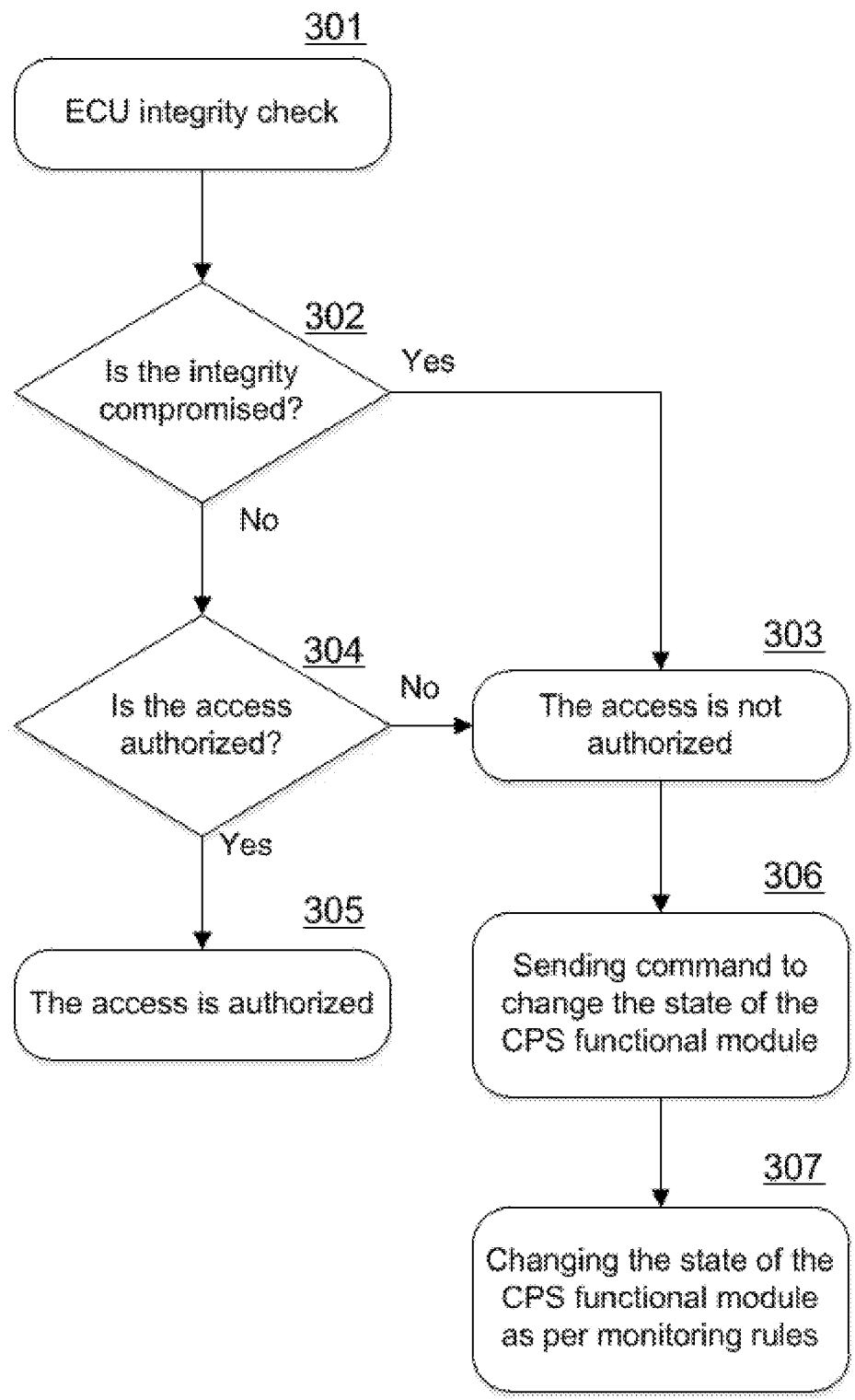
FIG. 3 is a flowchart of a method for CPS access monitoring, according to an embodiment.

Referring to FIG. 3, a flowchart of a method for CPS access monitoring is depicted, according to an embodiment. At 301, a mutual integrity check of the ECUs is performed. In an embodiment, the mutual integrity check can utilize at least two protection tools installed on the CPS electronic control units (ECUs) from the trusted ECU list. At 302, an evaluation of the ECUs' integrity is made. If the integrity is not compromised, the method proceeds to 304, which performs authorization of access to the CPS. If the ECUs' integrity is compromised, at 303 the method qualifies the access to the CPS as unauthorized. Also, the access to the CPS is qualified as unauthorized is the user did not perform an authorization at 304. If, however, the authorization went successfully, at 305 the method qualifies the access as authorized. In addition, the method at 303 detects a change in the state of at least one functional CPS module related to unauthorized access to the CPS. After that, at 306 a command is sent to the monitoring tool to change the state of at least one CPS functional module. In an embodiment, the command can be sent using at least one of the protection tools. Finally, at 307 the method changes, through the monitoring tool, the state of at least one CPS functional module using the monitoring rules.

Figure 4:
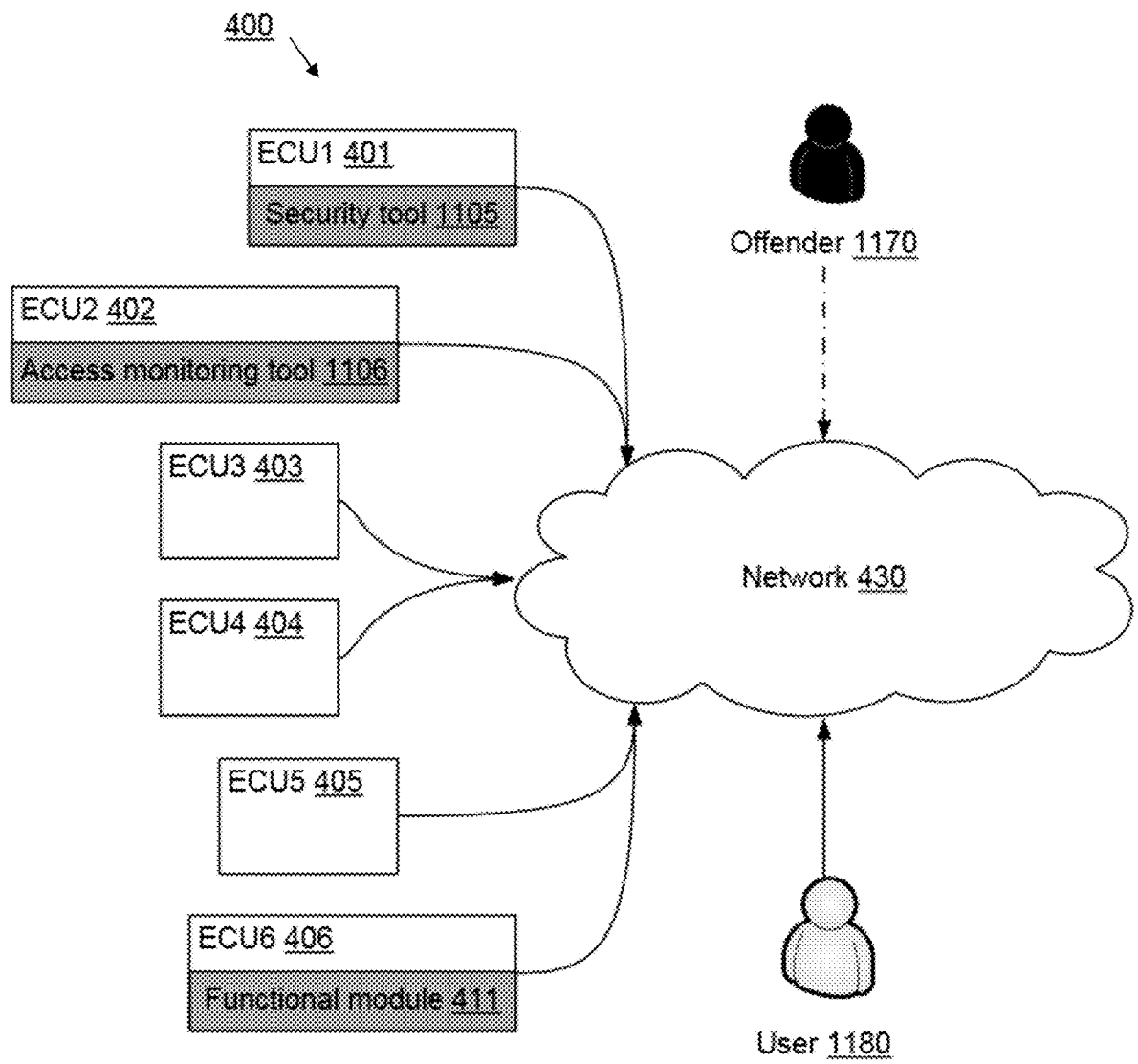
FIG. 4 is a block diagram of a CPS access monitoring system including protection against interception of authorization data, according to an embodiment.

Referring to FIG. 4, a block diagram of a CPS access monitoring system 400 including protection against interception of authorization data is depicted, according to an embodiment. The system 400 includes a security tool 1105 and an access monitoring tool 1106. In an embodiment, the security tool 1105 and the access monitoring tool 1106 are installed on one of the CPS ECUs 401-406 or are installed on or are themselves individual CPS ECUs.

In an embodiment, the access monitoring tool 1106 is an application on at least one of the ECUs; for example, for a vehicle, one of engine ECU, automatic transmission ECU, steering ECU, or parking system ECU. In an embodiment, immobilization commands are commands from the access monitoring tool 1106. In another embodiment, the access monitoring tool 1106 is one of the standard ECUs, in particular, for a vehicle, engine ECU, automatic transmission ECU, steering ECU, or parking system ECU. In an embodiment, immobilization commands are standard commands for these ECUs. In an embodiment, the security tool 1105 is provided as an application on at least one of the ECUs or as an individual ECU connected to the network.

The security tool 1105 is configured to analyze messages sent on the network during authorization of access to the CPS, create fictitious messages, which are, in turn, also directed to the same ECUs to which the analyzed messages are directed, send fictitious messages in random order and with random time delay, and qualify access to the CPS as unauthorized if the analyzed messages do not include correct authorization data. The access monitoring tool 1106 is configured to detect a change in the state of at least one CPS functional module 411 related to unauthorized access to the CPS, and to change the state of at least one CPS functional module 411 using the monitoring rules. Individual embodiments are presented below, such as in the description of FIG. 7.

Figure 5:
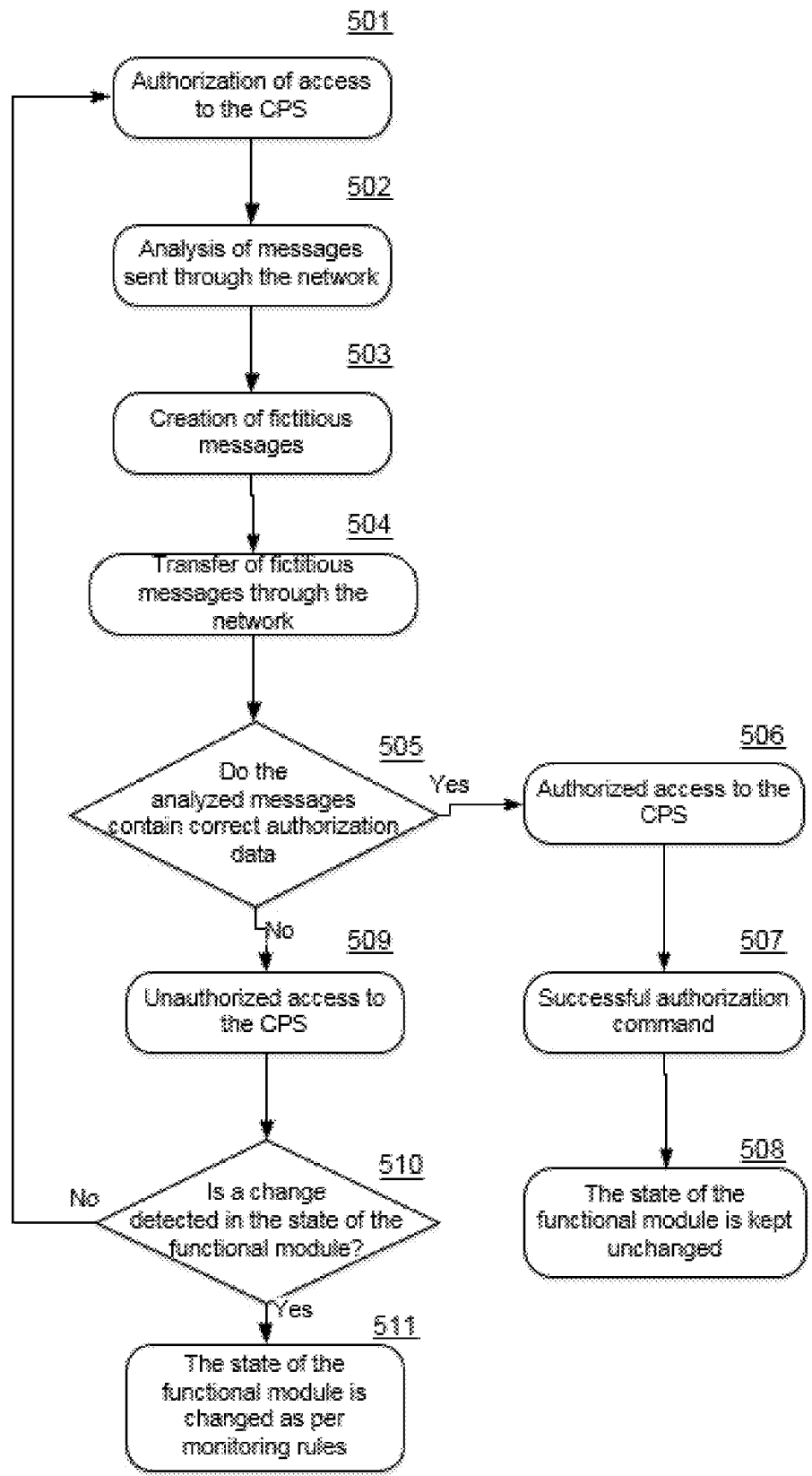
FIG. 5 is a flowchart of a method for CPS access monitoring including protection against interception of authorization data, according to an embodiment.

Referring to FIG. 5, a flowchart of a method for CPS access monitoring including protection against interception of authorization data is depicted, according to an embodiment. At 501 the method performs authorization of access to the CPS. During CPS access authorization, at 502, using the security tool, the method analyzes the messages sent through the network. At 503, using the security tool, the method creates fictitious messages, which are, in turn, directed to the same ECUs to which the analyzed messages are addressed. At 504, using the security tool, the method sends fictitious messages through the network in random order and with random delays. At 505 the method checks whether correct authorization data are included in the analyzed messages, and, if correct authorization data is included, access to the CPS is qualified at at 509 as unauthorized. Then, at 510 the method detects, using the access monitoring tool, a change in at least one functional CPS module related to unauthorized access to the CPS. And, if such change was detected, the method, using the access monitoring tool, changes at 511 the state of at least one CPS functional module via the monitoring rules. Otherwise, the method is repeated at 501.

If, at 505, the analyzed messages included correct authorization data, the method qualifies access to the CPS as authorized at 506. Then, the security tool can send a command to the access monitoring tool about successful authorization at 507. As a result, the access monitoring tool will keep the functional module's state unchanged (508). Individual embodiments are presented below, such as in the description of FIG. 7.

Figure 6:
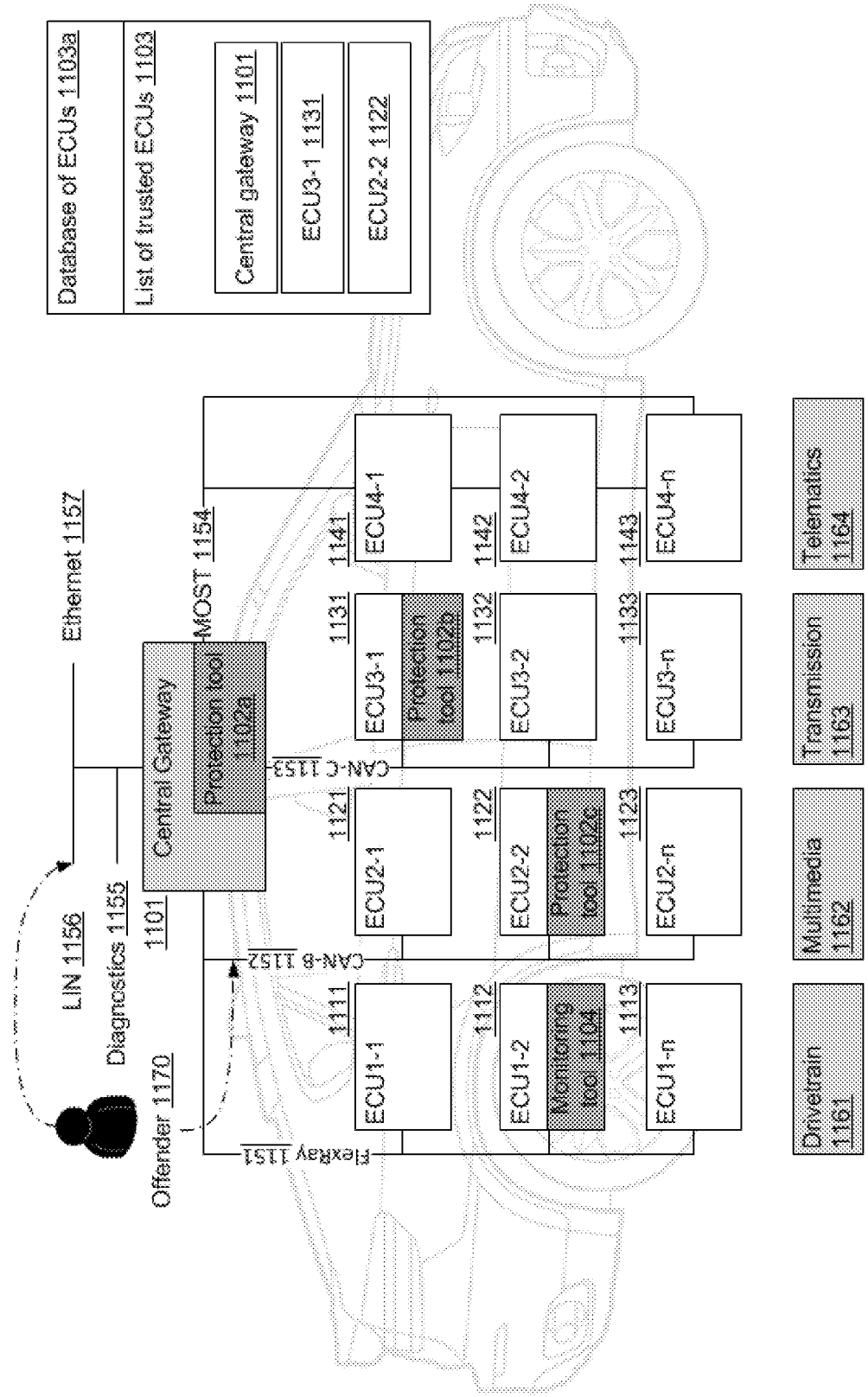
FIG. 6 is a block diagram of a CPS access monitoring system in a vehicle, according to an embodiment.

Referring to FIG. 6, a block diagram of a CPS access monitoring system in a vehicle is depicted, according to an embodiment. In an embodiment, a CPS access monitoring system is a vehicle immobilization system, and the vehicle is the CPS. The system includes at least two protection tools 1102 (in the provided example, there are three protection tools 1102a-1102c), which are installed on the ECUs from the trusted ECU list 1103 and are interconnected in the network 230 (which, for a vehicle CPS, includes data buses 1151-1157). The protection tools 1102a-1102c are configured for a mutual integrity check of the ECUs (in the provided example, ECUs 1101, 1122, 1131). The trusted ECU list 1103 includes at least two ECUs and can be pre-built, for example, by the CPS's manufacturer or dealer. The trusted ECU list 1103 is included in the trusted ECU database 1103a.

ECU integrity means correct operation of the protection tools 1102 installed on the ECUs. For example, if an offender disconnected one of the ECUs from the network 230 (which includes, for a vehicle, data buses 1151-1157), then the protection tool 1102 installed on the disconnected ECU will stop functioning, and, therefore, the ECU integrity will be compromised. Also, an offender can install malicious software to one of the above-mentioned ECUs. In this case, the protection tool 1102 may stop functioning correctly. As a result, ECU integrity will be also be compromised.

In the example in FIG. 6, the trusted ECU list 1103 includes the central gateway 101, the ECU3-1 1131 and the ECU2-2 1122, in which protection tools 1102a-1102c, respectively, are installed. In another individual case, the protection tools 1102 can be provided as individual ECUs connected to the network 230.

In an embodiment, the integrity check of ECUs from the trusted ECU list is made by sending messages between the protection tools 1102. For example, the messages include sent between the protection tools 1102 can include identification data, and, if at least one of the protection tools 1102 did not send a message to at least one other protection tool (based on the identification data), ECU integrity is considered to be compromised.

The protection tools 1102 are configured for authorizing access to a CPS (access for user 1180) if the integrity of the above-mentioned ECUs is not compromised. If the integrity of the above-mentioned ECUs is compromised, the protection tool 1102 qualifies the access to the CPS as unauthorized (for example, at an authorization attempt by an offender 1170 instead of the user 1180). In addition, the protection tool 1102 is used to send a command to the monitoring tool 1104 to change the state of at least one CPS functional module, if a change was detected in the state of at least one CPS functional module due to unauthorized access to the CPS. For example, in a vehicle CPS, a start of the vehicle's engine could have been detected, and the access to the vehicle is unauthorized. When the engine is started, for example, by turning the ignition on, the engine's ECU, which starts the engine after receiving a command, sends a message through the network (vehicle data bus). Therefore, the monitoring tool 1104 can detect an engine start, for example, having received such message through the network 230 (vehicle data bus).

In an embodiment, authorization of access to the CPS occurs by entering a password, which is a user-preset (sequential) combination of standard buttons. For example, when each button is pressed, a message is sent through the network to the message's intended ECU. In another embodiment, authorization of access to the CPS for the user 1180 is made using a transmitter/transponder connected in advance with one of the protection tools 1102 by sending authorization data through a wireless communication channel. In another embodiment, authorization is made using a mobile user device with an installed application. In an embodiment, access is authorized by, for example, entering a password in the application or using biometric authorization, connected in advance with one of the protection tools 1102, by sending authorization data through a wireless communication channel such as Bluetooth. In these examples, the authorization data received by the wireless communication receiver are then sent through the network 230 to ECUs for which the above-mentioned messages are intended.

It should be noted that, for a vehicle, commands for vehicle immobilization are messages sent through vehicle data buses. In an embodiment, an immobilization command is one of the following: a command to turn the engine off, a command to lock the wheels, a command to send a message to the vehicle owner's (legitimate user's) device, or a command to turn off the steering.

The monitoring tool 1104 (and the immobilization tool in the case of a vehicle) is configured for changing the state of at least one functional module of a CPS, using monitoring rules. In the vehicle example, the monitoring tool 1104 immobilizes the vehicle such that the independent functioning of the vehicle is prevented. For example, the monitoring tool 1104 can disable the engine, lock the wheels, disable the steering or send a message to the vehicle owner's device, depending on the command received.

In an embodiment, the monitoring tool 1104 is one of the standard ECUs which is a functional vehicle module that can prevent independent functioning of the vehicle, for example an engine ECU, an automatic transmission ECU, a steering ECU, a parking system ECU, etc. In another embodiment, the monitoring tool 1104 is provided as an application (i.e. a microprogram) on at least one of the vehicle's ECUs, such as on one of the engine ECU, automatic transmission ECU, steering ECU, or parking system ECU.

In an embodiment, the protection tools 1102a-1102c are configured as applications (i.e. microprograms) for the ECUs on which they are installed. In this case, the applications can be preinstalled by the vehicle manufacturer or the ECU manufacturer.

In addition, in an embodiment, a CPS user can activate a CPS access monitoring system (in the vehicle example, a vehicle immobilization system), for example, using a special service of the CPS's manufacturer, or at a CPS dealer. Both remote activation through a cloud service and activation through physical access to the CPS and the ECU are possible. In an embodiment, a list of trusted ECUs 1103 is created, on which protection tools 1102 will be installed, or applications/protection tools 1102 pre-installed on the ECUs will be activated. In one example, the list of trusted ECUs 1103 is built by the CPS manufacturer or the ECU manufacturer. The activation of a CPS access monitoring system includes creation, in the CPS, of a list of trusted ECUs 1103, installation of a protection tool 1102 on the CPS (or its launch if it is preinstalled on the CPS), creation, by the user, of CPS user authorization data (for example, a password) and transmission of the authorization data to a protection tool 1102a-1102c. In an embodiment, the activation of the CPS access monitoring system additionally includes installation of a monitoring tool 1104 on the CPS (or its launch if it is preinstalled on the CPS).

In another embodiment, at least one protection tool 1102 additionally checks at least one ECU which is a sender of CPS access authorization data, and, if the sender is an unauthorized sender, the access to the CPS is considered to be unauthorized.

In an embodiment, at least one protection tool 1102a-1102c, in a vehicle example, additionally determines that the immobilization commands were not delivered to an intended component, or that no vehicle immobilization was performed by the immobilization tool 1104. For example, an engine turn off command may not have been delivered. Subsequently, the at least one protection tool 1102a-1102c sends a second vehicle immobilization command. For example, if an engine turn off command was blocked by an offender 1170, another command can be sent, such as a steering turn off command.

In this case, the command can fail to be delivered to the intended recipient due to an offender 1170 blocking the command. The protection tool 1102 can then repeat the attempt to deliver the vehicle immobilization command. However, for example, in accordance with the CAN protocol specification, after 128 unsuccessful attempts to deliver a message (command), the ECU suspends the attempts to deliver the message and tries to send the message again at a later time. However, after 256 unsuccessful attempts to deliver the message, the ECU suspends further attempts to send the message until a restart of the ECU itself. In addition, the protection tool 1102 can confirm that the vehicle immobilization commands are blocked by an offender 1170, by listening to the messages which are sent through the vehicle's data bus with a known transmission address or mask. Accordingly, traditional ECUs do not have functionality for blocking commands from other ECUs. Therefore, the protection tool 1170 can detect commands from an offender 1170, causing blockage of vehicle immobilization commands from the protection tool 1102.

For example, if an offender 1170 blocked the first command, which was intended to turn off the vehicle's engine, a second command for locking the vehicle's wheels can be sent. In this case, the offender 1170 did not block the second command. But if the offender blocked the second command as well, the next command will be sent—for example, to turn off the steering, etc.

In another embodiment, the list of trusted ECUs 1103 is made so that at least two ECUs are connected to different vehicle buses (for example, to the CAN-C 1153 bus and to the CAN-B 1152 bus). In another example, at least one protection tool 1102 additionally intercepts the commands of the offender 1170 sent through the vehicle bus to which the ECU with the above-mentioned protection tool is connected. For example, the intercepted commands of the offender 1170 can be used to block the vehicle immobilization commands. Subsequently, another protection tool installed on another ECU, which is connected to another data bus of the vehicle, sends an immobilization command through the other data bus of the vehicle (for example, the second command will be sent to disable the steering).

In an embodiment, at least one protection tool 1102 intercepts the commands of the offender 1170 sent through the vehicle's data bus on which the ECU where the protection tool 1102 is installed. For example, the intercepted commands of the offender are used to block the vehicle immobilization commands. Subsequently, the vehicle immobilization command is modified using the protection tool 1102, and the modified vehicle immobilization command is sent again. In this case, the recipient of the commands (for example, the engine ECU) is able to receive both above-mentioned vehicle immobilization commands.

In an embodiment, commands are sent through an encoded communication channel. For example, messages between protection tools 1102, sent during ECU integrity checks, and commands to change the state of the CPS functional module are sent through the encoded channel. Encoding can be provided, for example, between the protection tools 1102 over the data transfer protocol through the network 230, and in particular, through data buses in the vehicle example.

It should be noted that minor electrical power is supplied to the vehicle's data buses and to the ECUs from the vehicle's battery, even when the ignition is off. This is necessary, for example, for the operation of such vehicle systems as the radio, window motors, headlights, etc. The protection tools 1102a-1102c and the immobilization tool 1104 can also operate with this power. This is applicable to other CPSs as well.

Therefore, systems and methods for monitoring access to a CPS as per FIGS. 2-3 and FIG. 6 solve the aforementioned technical problems such as imperfections in CPS access monitoring systems, enabling offenders to bypass such systems, and gain unauthorized access to CPSs, including in the example vehicles, in which anti-theft systems have deficiencies enabling offenders to bypass such anti-theft systems and steal the vehicle. Systems and methods described herein also allow improve the characteristics of cyber-physical system access monitoring tools, such as the locking degree, reliability, and fail-safety. In embodiments, using the protection tools 1102a-1102c integrity checks, and, even when all the ECUs on which the protection tools 1102a-1102c are installed, except one, are found and compromised (or disabled) by an offender 1170, the protection tool 1102 on the one remaining ECU can send a command to change the state of at least one CPS functional module to the monitoring tool 1104. The monitoring tool 1104, in turn, will change the state of the CPS functional modules, using monitoring rules, and will not allow unauthorized access to the CPS, thus improving existing cyber-physical system access monitoring tools. In addition, using the vehicle example, since the protection tools 1102 can be applications installed on standard ECUs of a vehicle, disabling some ECUs can be critical for driving the vehicle, and, therefore, the offender 1170 will not be able to disable or compromise such ECUs. As a result, the protection tools 1102a-1102c installed on such ECUs will immobilize the vehicle in case of an attempt at unauthorized start of the vehicle's engine. This also improves existing vehicle immobilizers.

Figure 7:
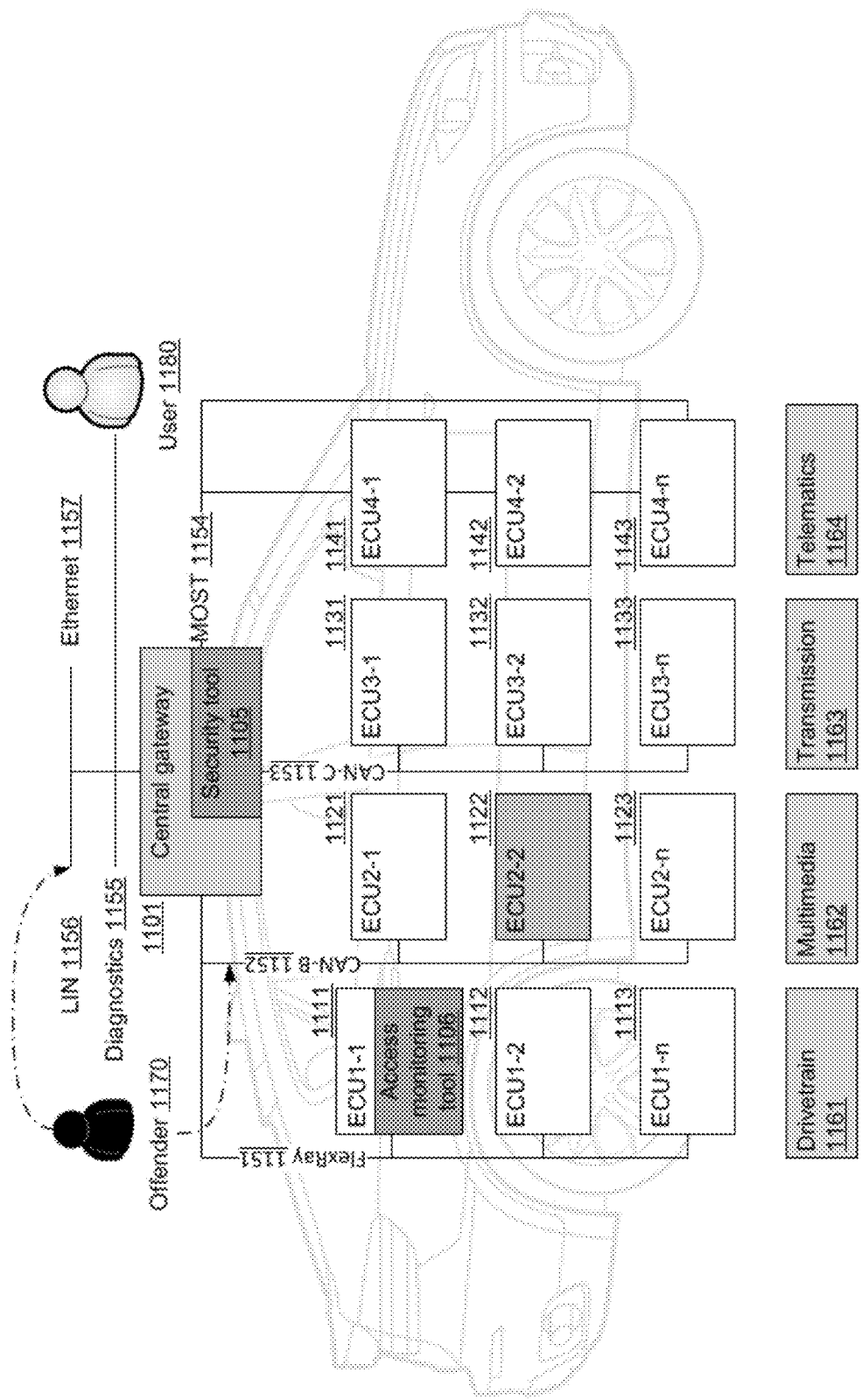
FIG. 7 is a block diagram of another CPS access monitoring system in a vehicle, according to an embodiment.

Referring to FIG. 7, a block diagram of another CPS access monitoring system in a vehicle is depicted, according to an embodiment. The system includes at least one security tool 1105, configured for analyzing messages sent during authorization of the CPS user through a network 430, which includes, in this example, vehicle data buses 1151-1157, to which the security tool 1105 is connected. In an embodiment, the security tool 1105 analyzes only the messages sent to certain ECUs, for which the messages participating in the authorization of the vehicle user are also intended.

In another embodiment, access to the CPS is authorized by entering a password which is a user-preset (sequential) combination of pressing standard CPS buttons. In this case, when each button is pressed, a message is sent through the network 430 to the ECU recipient of the message, and therefore, the authorization data consist in the above-mentioned password. In the vehicle example, the user can enter the password using the vehicle's multimedia system 1162, and therefore, when the password is entered, the messages intended for the ECUs participating in the vehicle user authorization (for example, ECU2-2 1122) are sent through the CAN-B 1152 bus. In another embodiment, authorization of access for the user 1180 is made using a transmitter/transponder connected in advance with one of the security tools 1105, by sending authorization data through a wireless communication channel. In another embodiment, authorization is made using a mobile user device with an installed application (in which the user is authorized, for example, by entering a password in the application or using biometric authorization), connected in advance with one of the security tools 1105, by sending authorization data through a wireless communication channel such as Bluetooth. In these examples, the authorization data received by the wireless communication receiver are then sent through vehicle data buses to the ECUs for which the above-mentioned messages are intended.

The security tool 1105 is also configured for creating fictitious messages, which will also be sent to the ECUs to which the messages being analyzed are sent (for example, ECU 1122). The fictitious messages can consist, for example, in random commands that the same ECU 1122 can receive and that can be used as user password characters. Then, the security tool 1105 sends the created fictitious messages in random order and with random delays through the network 230 (in the example being discussed, this is the CAN-B 1152 data bus). In this case, if the sequence of the messages analyzed by the security tool 1105 includes correct authorization data (i.e., the user 1180 entered the correct password), the access by the user 1180 to the CPS is considered to be authorized. In this case, the security tool 1105 sends a successful CPS access authorization command to at least one access monitoring tool 1106. If, however, the analyzed messages do not include correct authorization data, the security tool 1105 considers the access to the CPS to be unauthorized. When the access monitoring tool 1106 detects a change in the state of at least one CPS functional module related to unauthorized access to the CPS (in the vehicle example, this can be the start of the vehicle's engine), the access monitoring tool 1106 changes the state of at least one CPS functional module, using monitoring rules (in the vehicle example, the access monitoring tool 1106 immobilizes the vehicle if access to the vehicle is unauthorized). In case of successful authorization of the user 1180, the access monitoring tool 1106 does not prevent the CPS's operation, because the access monitoring tool 1106 has received a command for successful authorization from the security tool 1105.

In an embodiment, the CPS is, in particular, one of: a vehicle, an automated process control system (APCS), the Internet of Things, or the Industrial Internet of Things, while a functional module is represented by at least one CPS ECU for monitoring access to the CPS. In another embodiment, the vehicle's functional module is an ECU including one of the following: the engine, a wheel, or the steering. In such an embodiment, a change in the state of the functional module includes at least one of: a start of the vehicle's engine, or immobilization of the vehicle, while the monitoring rules include at least one of: immobilization of the vehicle if a start of the engine is detected.

When the engine is started, for example, by turning the ignition on, the engine's ECU, which starts the engine after receiving a command, sends a message through the vehicle data bus. Therefore, the access monitoring tool 1106 can detect an engine start, for example, having received such message through the vehicle data bus.

In an embodiment, the security tool 1105 is provided as an application (i.e. a microprogram) on at least one of the ECUs or as an individual ECU connected to the network 230. In an embodiment, the access monitoring tool 1106 is provided as an application (i.e. a microprogram) on at least one of the ECUs. For a vehicle, the access monitoring tool 1106 is provided on one of an engine ECU, automatic transmission ECU, steering ECU, parking system ECU. Accordingly, immobilization commands are commands of the access monitoring tool 1106 application.

In another embodiment, the immobilization tool 1106 is one of the standard ECUs. For a vehicle, ECUs can include an engine ECU, automatic transmission ECU, steering ECU, or parking system ECU. Accordingly, immobilization commands are standard commands of the above-mentioned ECUs.

In addition, in an embodiment, a CPS user can activate an access monitoring system with protection against authorization data interception using a special service of the CPS's manufacturer, or at a CPS's dealer. In this case, both remote activation through a cloud service of the CPS's manufacturer and activation through physical access to the CPS and the ECUs is possible. Activation of the CPS access monitoring system with protection against authorization data interception includes installation of a security tool 1105 and an access monitoring tool 1106 to the CPS (or launch of these tools if they are pre-installed in the CPS), creation of CPS access authorization data by the user (for example, a user password), and transmission of the authorization data to the security tool 1105 in a processed form (for example, in encrypted form or in the form of a hash function).

In an embodiment, upon analysis of a message by the security tool 1105, the vehicle data bus is locked for a time during which the checksum of the message being analyzed is sent, so that the checksum of the analyzed message would not be sent through the vehicle data bus. During subsequent transfer of fictitious messages, the vehicle's data bus is locked as well. In this example, the CAN-B 1152 bus or the CAN-C 1153 bus are also locked (whichever is used to send the message to be analyzed).

In another embodiment, during transfer of messages through a vehicle data bus, the message's address is analyzed. Based on the analyzing, if the message's address indicates that the message is intended for certain ECUs, the vehicle's data bus is locked at the moment when the message's checksum is sent, so that the messages checksum would be distorted and the message are not processed by the recipient device. In yet another embodiment, during transfer of fictitious messages, an incorrect value is also set in the checksum field of such messages, so that it would not be possible to distinguish the fictitious messages generated by the device from other distorted messages on the vehicle's data bus by the nature of the damage to the checksum. This can be achieved, for example, if the checksum field for both types of messages is set to a value equal to 0, as applied to the CAN bus.

It should be noted that minor electrical power is supplied to the vehicle's data buses (and, in the general case, to the network 430 for the CPS) and to the ECUs from the vehicle's battery, even when the ignition is off. This is necessary, for example, for the operation of such vehicle systems as the radio, window motors, headlights, etc. The security tool 1105 and the access monitoring tool 1106 can operate with this power as well.

The systems and methods described in, for example, FIGS. 4-5 and FIG. 7, as well as their individual embodiments, can be used to ensure additional protection from user authorization data interception in the systems and methods for user immobilization as per FIGS. 2-3 and FIG. 6 as individual embodiments.

As an example of the operation of the claimed system and method, described in FIGS. 4-5 and FIG. 7, a possible scenario of an offender 1170 obtaining vehicle authorization data is now discussed in contrast to a traditional system. For example, to obtain vehicle authorization data, the offender 1170 can in advance gain access to the vehicle's data bus (through which user authorization messages are sent, such as via the CAN-B 1152 bus). Security specialists Charlie Miller and Chris Valasek published a number of articles dealing with vehicle security. The researchers described a method for gaining control of a 2010 Toyota Prius and a 2010 Ford Escape, using a notebook and a Nintendo gamepad, by affecting a cyber attack on ECUs, consisting in transfer of packets through a Controller Area Network (CAN) bus. Miller and Valasek were also able to hack a 2014 Jeep Cherokee by entering the vehicle's network using Wi-Fi thereby exploiting a vulnerability in the vehicle's on-board multimedia system. Another point of entry was a vulnerability in a communication port of the Spirit cell operator. In order to gain control of vehicle electronic systems, the researchers conducted a cyber attack on a CAN bus by modifying the firmware of the CAN bus controller by implementing a special program code. As a result of the cyber attack, the researchers were able to remotely control the steering wheel, the brake system, and other electronic systems of the vehicle.

The vehicle's user (owner) 1180 makes the vehicle's authorization, by entering a preset password in the multimedia system 1162. The characters entered are then processed by the ECU 1122. When each password character is entered, the ECU 1122 sends a message through the CAN-B 1152 bus. In case of successful authorization, traditional systems would subsequently allow the vehicle to start without immobilize it. However, an offender 1170 who gained access to the CAN-B 1152 bus can intercept the password entered by the vehicle's user 1180. And, after the owner 1180 leaves the vehicle unattended, the offender 1170 would then able to steal the vehicle by entering the intercepted password and bypassing the vehicle immobilization systems.

In contrast, the systems and methods described, for example, in FIGS. 4-5 and FIG. 7 do not allow the offender to intercept messages including authorization data, even if the offender 1170 gains access to the vehicle's data buses. This is because the '123 security tool 1105, during transfer of messages including authorization data, creates fictitious messages and sends them in random order and with random delays. Therefore, the offender 1170 is not able to determine the vehicle owner's password, because the messages intercepted by the offender will also include fictitious messages along with the password. Moreover, the offender 1170 is not able to determine the vehicle user's password even if he/she intercepts two or more successful authorizations of the vehicle user, because at each subsequent vehicle user authorization, new random fictitious messages are created and sent in a new random order and with new random delay in relation to the previous authorization of the vehicle's user.

In addition, for additional protection, the security tool 1105 can lock a vehicle data bus during transfer of messages including a password character, so that the checksum of the analyzed messages is not sent through the vehicle's data bus. As a result, the message's checksum will be corrupted and will not match the checksum of the message's content, which will be calculated by the ECU that received the message. Therefore, the message can also be ignored by the ECU to which the offender gained access. This will ensure additional protection against interception of the user password.

Therefore, the systems and methods described herein, such as in FIGS. 4-5 and FIG. 7 solve the aforementioned technical problems of imperfections in CPS access monitoring systems which allows offenders to bypass such systems and gain unauthorized access to CPSs. Further technical problems for vehicles with traditional anti-theft systems that are solved are deficiencies enabling offenders to bypass anti-theft systems to steal the vehicle. In addition, systems and methods improve cyber-physical system access monitoring tools, such as the locking degree, reliability, and fail-safety, and prevent an offender from obtaining data required for authorization of access to a CPS.

Figure 9:
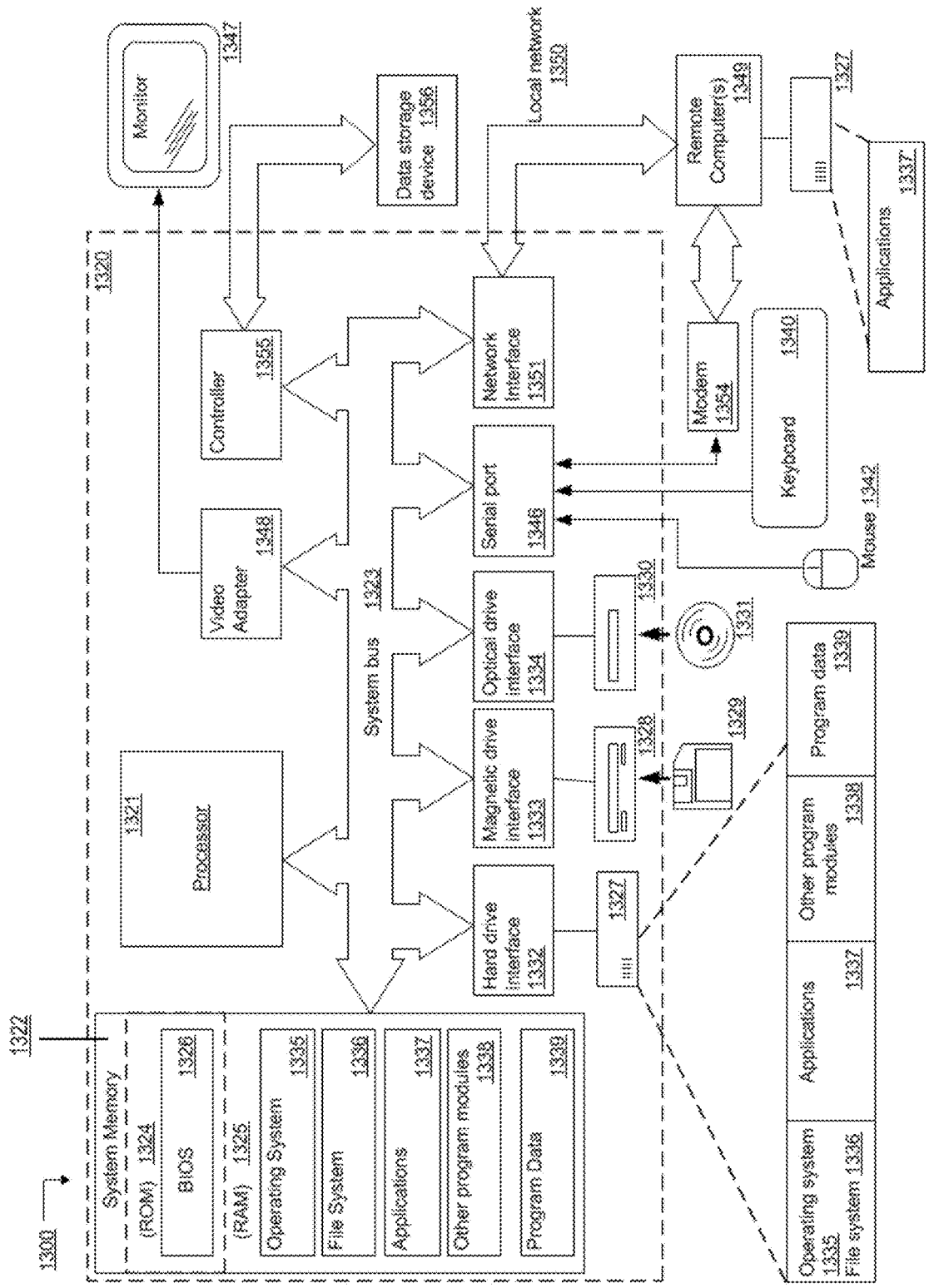
FIG. 9 is a block diagram of a computer system configured to implement embodiments described herein.

Referring to FIG. 9, a diagram illustrating in greater detail a computer system 1300 on which aspects of the invention as described herein may be implemented according to various embodiments is depicted.

The computer system 1300 can comprise a computing device such as a personal computer 1320 includes one or more processing units 1321, a system memory 1322 and a system bus 1323, which includes various system components, including a memory connected with the one or more processing units 1321. In various embodiments, the processing units 1321 can include multiple logical cores that are able to process information stored on computer readable media. The system bus 1323 is realized as any bus structure known at the relevant technical level, including, in turn, a bus memory or a bus memory controller, a peripheral bus and a local bus, which is able to interact with any other bus architecture. The system memory can include non-volatile memory such as Read-Only Memory (ROM) 1324 or volatile memory such as Random Access Memory (RAM) 1325.

The Basic Input/Output System (BIOS) 1326 includes basic procedures ensuring transfer of information between the elements of personal computer 1320, for example, during the operating system boot using ROM 1324.

Personal computer 1320, in turn, has a hard drive 1327 for data reading and writing, a magnetic disk drive 1328 for reading and writing on removable magnetic disks 1329, and an optical drive 1330 for reading and writing on removable optical disks 1331, such as CD-ROM, DVD-ROM and other optical media. The hard drive 1327, the magnetic drive 1328, and the optical drive 1330 are connected with system bus 1323 through a hard drive interface 1332, a magnetic drive interface 1333 and an optical drive interface 1334, respectively. The drives and the corresponding computer information media represent energy-independent means for storage of computer instructions, data structures, program modules and other data on personal computer 1320.

The system depicted includes hard drive 1327, a removable magnetic drive 1329 and a removable optical drive 1330, but it should be understood that it is possible to use other types of computer media, capable of storing data in a computer-readable form (solid state drives, flash memory cards, digital disks, random-access memory (RAM), etc.), connected to system bus 1323 through a controller 1355.

The computer 1320 comprises a file system 1336, where the recorded operating system 1335 is stored, as well as additional program applications 1337, other program engines 1338 and program data 1339. The user can input commands and information into the personal computer 1320 using input devices (keyboard 1340, mouse 1342). Other input devices (not shown) can also be used, such as: a microphone, a joystick, a game console, a scanner, etc. Such input devices are usually connected to the computer system 1320 through a serial port 1346, which, in turn, is connected to a system bus, but they can also be connected in a different way—for example, using a parallel port, a game port or a Universal Serial Bus (USB). The monitor 1347 or another type of display device is also connected to system bus 1323 through an interface, such as a video adapter 1348. In addition to monitor 1347, personal computer 1320 can be equipped with other peripheral output devices (not shown), such as speakers, a printer, etc.

Personal computer 1320 is able to work in a network environment; in this case, it uses a network connection with one or several other remote computers 1349. Remote computer(s) 1349 is (are) similar personal computers or servers, which have most or all of the above elements, noted earlier when describing the substance of personal computer 1320 shown in FIG. 9. The computing network can also have other devices, such as routers, network stations, peering devices or other network nodes.

Network connections can constitute a Local Area Network (LAN) 1350 and a World Area Network (WAN). Such networks are used in corporate computer networks or in corporate intranets, and usually have access to the Internet. In LAN or WAN networks, personal computer 1320 is connected to the Local Area Network 1350 through a network adapter or a network interface 1351. When using networks, personal computer 1320 can use a modem 1354 or other means for connection to a world area network, such as the Internet. Modem 1354, which is an internal or an external device, is connected to system bus 1323 through serial port 1346. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for controlling access to a cyber-physical system (CPS), the system comprising:
at least one electronic control unit (ECU) including at least one processor and memory operably coupled to the at least one processor;
instructions that, when executed on the at least one ECU, cause the at least one ECU to implement:
a security tool configured to—
perform access authorization by:
analyzing a plurality of messages sent through the CPS,
creating a plurality of fictitious messages, the plurality of fictitious messages addressed to at least one of the ECUs to which the plurality of messages are addressed,
sending the plurality of fictitious messages though the CPS in random order and with random delay, and
checking whether correct authorization data is included in the analyzed messages to determine authorized or unauthorized access to the CPS;
an access monitoring tool configured to—
detect a change in at least one functional CPS module related to unauthorized access to the CPS, and
responsive to the detection of a change in at least one functional CPS module related to unauthorized access to the CPS, change a state of at least one functional CPS module using at least one monitoring rule.

2. The system of claim 1, further comprising a database of trusted ECUs including a trusted ECU list, wherein the security tool is installed on a first ECU and the access monitoring tool is installed on a second ECU, and wherein the first ECU and the second ECU are included on the trusted ECU list.

3. The system of claim 1, wherein the access monitoring tool is further configured to send a first integrity check message to the security tool,
wherein the security tool is further configured to send a second integrity check message to the access monitoring tool, and determine unauthorized access to the CPS when the access monitoring tool fails to send the first integrity message, and
wherein the access monitoring tool is further configured to determine unauthorized access to the CPS when the security tool fails to send the second integrity message.

4. The system of claim 3, wherein the first integrity check message and the second integrity check message are sent through an encoded communication channel.

5. The system of claim 1, wherein when the security tool determines authorized access, the security tool is further configured to send a successful CPS authorization message to the access monitoring tool.

6. The system of claim 1, wherein the CPS is a vehicle comprising a plurality of data buses connecting a drivetrain subsystem, a multimedia subsystem, a transmission subsystem, and a telematics subsystem.

7. The system of claim 6, wherein the at least one functional CPS module is at least one of a vehicle engine ECU included in the drivetrain subsystem, a vehicle wheel ECU included in the transmission subsystem, or a vehicle steering ECU included in the transmission subsystem, and wherein the at least one monitoring rule comprises disabling the vehicle through at least one of the vehicle engine ECU, the vehicle wheel ECU, or the vehicle steering ECU.

8. The system of claim 6, wherein detecting the change in at least one functional CPS module includes a start of the vehicle's engine or immobilization of the vehicle.

9. The system of claim 6, wherein the security tool is installed on a central gateway coupling the drivetrain subsystem, the multimedia subsystem, the transmission subsystem, and the telematics subsystem.

10. The system of claim 6, wherein the security tool is configured to selectively analyze the plurality of messages by ignoring messages unrelated to authorization of a user of the vehicle.

11. The system of claim 1, wherein the security tool is preinstalled on the ECU by a manufacturer, and wherein the security tool is further configured to receive access authorization data from a user, the access authorization data determining access to the CPS.

12. A method for controlling access to a cyber-physical system (CPS), the system including at least one electronic control unit (ECU) including at least one processor and memory operably coupled to the at least one processor, the method comprising:
- performing access authorization by:
  - analyzing a plurality of messages sent through the CPS,
  - creating a plurality of fictitious messages, the plurality of fictitious messages addressed to at least one of the ECUs to which the plurality of messages are addressed,
  - sending the plurality of fictitious messages though the CPS in random order and with random delay, and
  - checking whether correct authorization data is included in the analyzed messages to determine authorized or unauthorized access to the CPS;
- detecting a change in at least one functional CPS module related to unauthorized access to the CPS; and
- responsive to the detection of a change in at least one functional CPS module related to unauthorized access to the CPS, changing a state of at least one functional CPS module using at least one monitoring rule.

13. The method of claim 12, wherein the performing access authorization is implemented by a security tool and the detecting a change in the at least one functional CPS module and changing the state of the at least one functional CPS module is implemented by an access monitoring tool, the method further comprising:
- sending a first integrity check message from the access monitoring tool to the security tool;
- sending a second integrity check message from the security tool to the access monitoring tool;
- determining unauthorized access to the CPS when the access monitoring tool fails to send the first integrity message; and
- determining unauthorized access to the CPS when the security tool fails to send the second integrity message.

14. The method of claim 13, wherein the first integrity check message and the second integrity check message are sent through an encoded communication channel.

15. The method of claim 12, further comprising when authorized access is determined, generating a successful CPS authorization message.

16. The method of claim 13, further comprising:
- preinstalling the security tool on the ECU; and
- receiving access authorization data from a user, the access authorization data determining access to the CPS.

17. A vehicle comprising:
- a drivetrain gateway configured to deliver power to vehicle wheels;
- a multimedia gateway configured to control multimedia for the vehicle;
- a transmission gateway configured to control the vehicle wheels through the drivetrain gateway, wherein each of the drivetrain gateway, the multimedia gateway, and the transmission gateway includes at least one electronic control unit (ECU);
- at least one security tool configured to perform access authorization by:
  - analyzing a plurality of messages sent through the vehicle,
  - creating a plurality of fictitious messages,
  - sending the plurality of fictitious messages though the vehicle, and
  - checking whether correct authorization data is included in the analyzed messages to determine authorized or unauthorized access to the vehicle; and
- at least one access monitoring tool configured to:
  - detect a change in at least one functional CPS module related to unauthorized access to the CPS, and
  - responsive to the detection of a change in at least one functional CPS module related to unauthorized access to the CPS, change a state of at least one functional CPS module using at least one monitoring rule.

18. The vehicle of claim 17, wherein the at least one functional CPS module is at least one of a vehicle engine ECU included in the drivetrain subsystem, a vehicle wheel ECU included in the transmission subsystem, or a vehicle steering ECU included in the transmission subsystem, and wherein the at least one monitoring rule comprises disabling the vehicle through at least one of the vehicle engine ECU, the vehicle wheel ECU, or the vehicle steering ECU.

19. The vehicle of claim 17, wherein detecting the change in at least one functional CPS module includes a start of the vehicle's engine or immobilization of the vehicle.

20. The vehicle of claim 17, wherein the security tool is configured to selectively analyze the plurality of messages by ignoring messages unrelated to authorization of a user of the vehicle.

* * * * *